US009371083B1

(12) United States Patent
Jones et al.

(10) Patent No.: US 9,371,083 B1
(45) Date of Patent: Jun. 21, 2016

(54) COLLAPSIBLE STACKABLE STORAGE CART

(71) Applicant: Acu-Pac, Inc., Benton, AR (US)

(72) Inventors: Jason N. Jones, Benton, AR (US); Thomas M. Snoddy, Benton, AR (US)

(73) Assignee: Acu-Pac, Inc., Benton, AR (US)

(*) Notice: Subject to any disclaimer, the term of this patent is extended or adjusted under 35 U.S.C. 154(b) by 0 days.

(21) Appl. No.: 14/726,024

(22) Filed: May 29, 2015

Related U.S. Application Data

(63) Continuation of application No. 14/572,222, filed on Dec. 16, 2014, now abandoned.

(51) Int. Cl.
*B62B 3/00* (2006.01)
*B62B 3/02* (2006.01)
*B62B 3/16* (2006.01)

(52) U.S. Cl.
CPC ............... *B62B 3/025* (2013.01); *B62B 3/007* (2013.01); *B62B 3/165* (2013.01)

(58) Field of Classification Search
CPC ......... B66F 7/065; B66F 7/0625; B62B 3/02; B62B 3/022; B62B 3/025; B62B 2205/06
See application file for complete search history.

(56) References Cited

U.S. PATENT DOCUMENTS

| 1,146,779 | A | * | 7/1915 | Bailey | B66F 7/065 254/8 C |
| 1,744,718 | A | | 8/1928 | Baumgartner | |
| 2,492,676 | A | * | 12/1949 | Zajicek | B62B 3/022 280/641 |
| 2,531,856 | A | | 11/1950 | Marcouiller | |
| 2,812,188 | A | | 11/1957 | Rusch | |
| 2,899,172 | A | * | 8/1959 | Cresci | B60P 1/02 254/122 |
| 3,032,319 | A | * | 5/1962 | Ingvald | B65H 31/18 182/158 |
| 3,082,016 | A | * | 3/1963 | Pratt | B62B 5/0003 280/641 |
| 3,110,476 | A | * | 11/1963 | Farris | B65G 69/24 108/119 |
| 3,228,659 | A | * | 1/1966 | Horst-Ernst | B66F 7/065 182/141 |
| 3,292,902 | A | * | 12/1966 | Lynch | B66F 3/12 254/122 |
| 3,308,485 | A | * | 3/1967 | Nesbit-Evans | A61G 7/005 108/147 |
| 3,686,696 | A | * | 8/1972 | Lanigan | A61G 7/002 5/611 |
| 3,913,935 | A | | 10/1975 | McGillicuddy | |
| 3,953,047 | A | * | 4/1976 | Morgan | B62B 3/16 280/33.998 |
| 4,062,556 | A | | 12/1977 | Evans | |
| 4,199,170 | A | * | 4/1980 | Hubner | B62B 5/0003 280/641 |
| 4,221,280 | A | * | 9/1980 | Richards | B66F 7/065 187/269 |

(Continued)

FOREIGN PATENT DOCUMENTS

| AU | 89/00209 | 11/1990 |
| WO | WO98/38071 | 9/1998 |
| WO | WO2010/106464 | 9/2010 |

*Primary Examiner* — Brodie Follman
(74) *Attorney, Agent, or Firm* — Joe D. Calhoun

(57) ABSTRACT

A stackable cart for storing items when in a collapsed configuration, including a wheeled base, an elevation means such as a scissor extension apparatus attached to the wheeled base, a basket frame attached to the scissor extension apparatus, and an actuation mechanism governing the height of the basket in a raised configuration of the cart.

17 Claims, 37 Drawing Sheets

(56) References Cited

U.S. PATENT DOCUMENTS

| | | | | |
|---|---|---|---|---|
| 4,249,749 A * | 2/1981 | Collier | | B62B 1/00 |
| | | | | 108/145 |
| 4,251,056 A * | 2/1981 | Maniglia | | B66F 17/00 |
| | | | | 254/8 B |
| 4,340,012 A * | 7/1982 | Gustafson | | A61G 13/06 |
| | | | | 119/723 |
| 4,457,403 A * | 7/1984 | Ream | | B66F 11/042 |
| | | | | 182/141 |
| 4,488,326 A * | 12/1984 | Cherry | | B66F 7/0625 |
| | | | | 14/69.5 |
| 4,523,768 A | 6/1985 | Dlubala | | |
| 4,558,847 A * | 12/1985 | Coates | | A61D 3/00 |
| | | | | 254/122 |
| 4,655,466 A * | 4/1987 | Hanaoka | | B62B 3/02 |
| | | | | 108/145 |
| 4,712,653 A * | 12/1987 | Franklin | | B66F 7/08 |
| | | | | 108/145 |
| 4,741,512 A * | 5/1988 | Elkuch | | B66F 7/065 |
| | | | | 248/421 |
| 5,002,293 A * | 3/1991 | Gottselig | | B62B 3/02 |
| | | | | 108/145 |
| 5,016,858 A * | 5/1991 | Mitchell | | B66F 7/0625 |
| | | | | 254/122 |
| 5,018,931 A * | 5/1991 | Uttley | | A61G 7/08 |
| | | | | 188/5 |
| 5,193,649 A * | 3/1993 | Lee | | B66F 7/0625 |
| | | | | 182/141 |
| 5,429,210 A * | 7/1995 | Hansen | | B66B 9/16 |
| | | | | 187/243 |
| 5,454,625 A * | 10/1995 | Christensen | | B62B 3/08 |
| | | | | 187/244 |
| 5,503,368 A * | 4/1996 | Torres | | B66F 7/0608 |
| | | | | 254/122 |
| 5,588,377 A * | 12/1996 | Fahmian | | A47B 9/00 |
| | | | | 108/145 |
| 5,649,718 A | 7/1997 | Groglio | | |
| 5,730,452 A | 3/1998 | Fields | | |
| 5,738,365 A | 4/1998 | McCarthy | | |
| 5,829,948 A * | 11/1998 | Becklund | | B66F 7/0625 |
| | | | | 187/237 |
| 5,951,075 A | 9/1999 | Green | | |
| 5,979,606 A * | 11/1999 | Wheeler | | B65G 47/643 |
| | | | | 187/269 |
| 6,098,961 A * | 8/2000 | Gionet | | B66F 7/065 |
| | | | | 254/122 |
| 6,431,319 B1 * | 8/2002 | Myers | | B62B 3/02 |
| | | | | 187/243 |
| 6,575,155 B2 * | 6/2003 | Brennan | | A47J 37/0763 |
| | | | | 126/276 |
| 6,663,119 B2 | 12/2003 | White | | |
| 6,719,306 B2 | 4/2004 | White | | |
| 6,725,855 B1 * | 4/2004 | Brennan | | A47J 37/0763 |
| | | | | 126/276 |
| 6,789,829 B1 * | 9/2004 | Kapels | | B62D 33/02 |
| | | | | 296/11 |
| 6,857,493 B2 * | 2/2005 | Shupp | | B60T 7/16 |
| | | | | 180/168 |
| 6,929,250 B2 * | 8/2005 | Blake | | B62B 1/002 |
| | | | | 254/122 |
| 7,070,189 B2 * | 7/2006 | Grauss | | B25H 5/00 |
| | | | | 108/147 |
| 7,188,824 B2 * | 3/2007 | Blake | | B62B 1/002 |
| | | | | 254/122 |
| 7,249,771 B1 * | 7/2007 | Brennan | | A47J 37/0704 |
| | | | | 280/35 |
| 7,398,571 B2 * | 7/2008 | Souke | | A61G 1/0212 |
| | | | | 296/20 |
| 7,549,415 B2 | 6/2009 | Karellas | | |
| 7,725,968 B2 * | 6/2010 | Lambarth | | A61G 1/04 |
| | | | | 296/20 |
| 8,052,120 B2 * | 11/2011 | Bacon | | B66F 7/0625 |
| | | | | 180/168 |
| D655,063 S | 2/2012 | Kravitz | | |
| 8,172,255 B1 * | 5/2012 | Martin | | B62B 3/04 |
| | | | | 187/244 |
| 8,172,256 B2 | 5/2012 | Fine | | |
| 8,241,200 B2 * | 8/2012 | Chinn | | A61G 1/0293 |
| | | | | 248/129 |
| 8,505,960 B1 * | 8/2013 | Shindelar | | B62B 1/00 |
| | | | | 280/47.34 |
| 8,702,111 B2 * | 4/2014 | Simoes | | B62B 3/025 |
| | | | | 280/33.998 |
| 8,740,191 B2 * | 6/2014 | Litcher | | B66F 3/22 |
| | | | | 254/122 |
| 8,814,199 B2 * | 8/2014 | Shindelar | | B62B 3/02 |
| | | | | 280/47.34 |
| 9,132,848 B2 * | 9/2015 | Sekine | | B66F 9/07586 |
| 2002/0149163 A1 | 10/2002 | Lee, Jr. | | |
| 2003/0015858 A1 | 1/2003 | Chu | | |
| 2003/0038457 A1 | 2/2003 | Eskridge | | |
| 2005/0275195 A1 | 12/2005 | Matula | | |
| 2006/0027983 A1 | 2/2006 | Pederson | | |
| 2010/0230934 A1 | 9/2010 | Fine | | |
| 2012/0119458 A1 * | 5/2012 | Simoes | | B62B 3/025 |
| | | | | 280/33.998 |
| 2012/0145718 A1 | 6/2012 | Quarry | | |
| 2012/0193894 A1 | 8/2012 | Fine | | |
| 2013/0200585 A1 | 8/2013 | Hoeper | | |
| 2014/0062042 A1 | 3/2014 | Wagner | | |
| 2014/0097599 A1 | 4/2014 | Panigot | | |

* cited by examiner

COLLAPSIBLE STACKABLE STORAGE CART

This application is a continuation of pending U.S. patent application Ser. No. 14/572,222 filed 16 Dec. 2014, and claims the benefit of the filing date thereof.

FIELD OF THE INVENTION

The present disclosure relates to a storage apparatus, more specifically a collapsible and stackable cart for storing balls.

BACKGROUND OF THE INVENTION

Storage space is often limited. Stacking of boxes and other containers has provided a solution for some storage limitations, but not for fields of use where it is advantageous or desirable to frequently use the stored contents, especially in a location somewhat remote from the storage place. For example, it is advantageous and desirable for those involved in sports using balls to have convenient access to game balls during practice. However, often storage space is limited for balls and equipment used in exercise and team sports. Moreover, known collapsible bins are relatively immobile and/or too flimsy to be practical; and none provide for mobile storage.

BRIEF SUMMARY OF THE INVENTION

In general, the invention disclosed herein includes (comprises) a cart for storing items when in a collapsed configuration and which can be stacked with another such carts, comprising a wheeled base supporting an elevation means supporting a receptacle, and an actuation mechanism governing the height of the receptacle, usually in a resting configuration of the cart.

A principal object of the current disclosure is to provide a strong and durable collapsible cart for storing and accessing items, preferably balls used in games. The invention is essentially a rolling cart having a receptacle capable of holding a number of items, such as (for example) volleyballs. In this example, there may be one layer of volleyballs on the bottom of the receptacle; and the depressions between the tops of adjacent volleyballs may compactly hold a second layer of volleyballs.

Another object of the current disclosure is to provide a cart that is collapsible, while retaining the items for storage.

Yet another object of the current disclosure is to provide several collapsed storage carts that can be stacked atop each other, while retaining the items for storage and may remain mobile as a group. The disclosure at hand in one aspect provides a collapsible stackable storage cart that includes a wheeled base, a scissor extension apparatus attached to the wheeled base, and a receptacle attached to the scissor extension apparatus.

The collapsible stackable storage cart may include a wheeled base, and a dual scissor extension apparatus attached to the wheeled base, wherein the scissor extension includes two cross members that are rotatably attached to the wheeled base; the scissor extension also includes two other cross members that are slidably attached to the wheeled base, wherein each of the two first-mentioned cross members are rotatably attached to one of the two other cross members, respectively. For an actuation mechanism, each of the two other cross members may be slidably attached to a notched (or multi-notched) member associated with the wheeled base; and a basket frame is attached to the scissor extension apparatus.

The wheeled base may have medial guide tracks inset toward the central longitudinal axis of the cart, each supporting a pair of scissor-legs, each of which supports an upper guide track. The upper guide tracks may support upper ends, each of which may include uprights that (along with the guide tracks) support a receptacle; the upper end(s) may also include one or more downstanding members (or stops), that will bear the weight of the cart(s) and any contents when in the fully collapsed configuration.

These and other aspects of the disclosed subject matter, as well as additional novel features, will be apparent from the description provided herein. The intent of this summary is not to be a comprehensive description of the subject matter, but rather to provide a short overview of some of the subject matter's functionality. Other systems, methods, features and advantages herein provided will become apparent to one with skill in the art upon examination of the accompanying Figures and detailed description. It is intended that all such additional systems, methods, features and advantages that are included within this description, be within the scope of any claims filed now or later.

BRIEF DESCRIPTION OF THE DRAWINGS

The novel features believed characteristic of the disclosed subject matter will be set forth in any claims that are filed later. The disclosed subject matter itself, however, as well as a preferred mode of use, further objectives, and advantages thereof, will best be understood by reference to the following detailed description of an illustrative embodiment when read in conjunction with the accompanying drawings.

DETAILED DESCRIPTION OF ILLUSTRATIVE EMBODIMENTS

Figure 1:
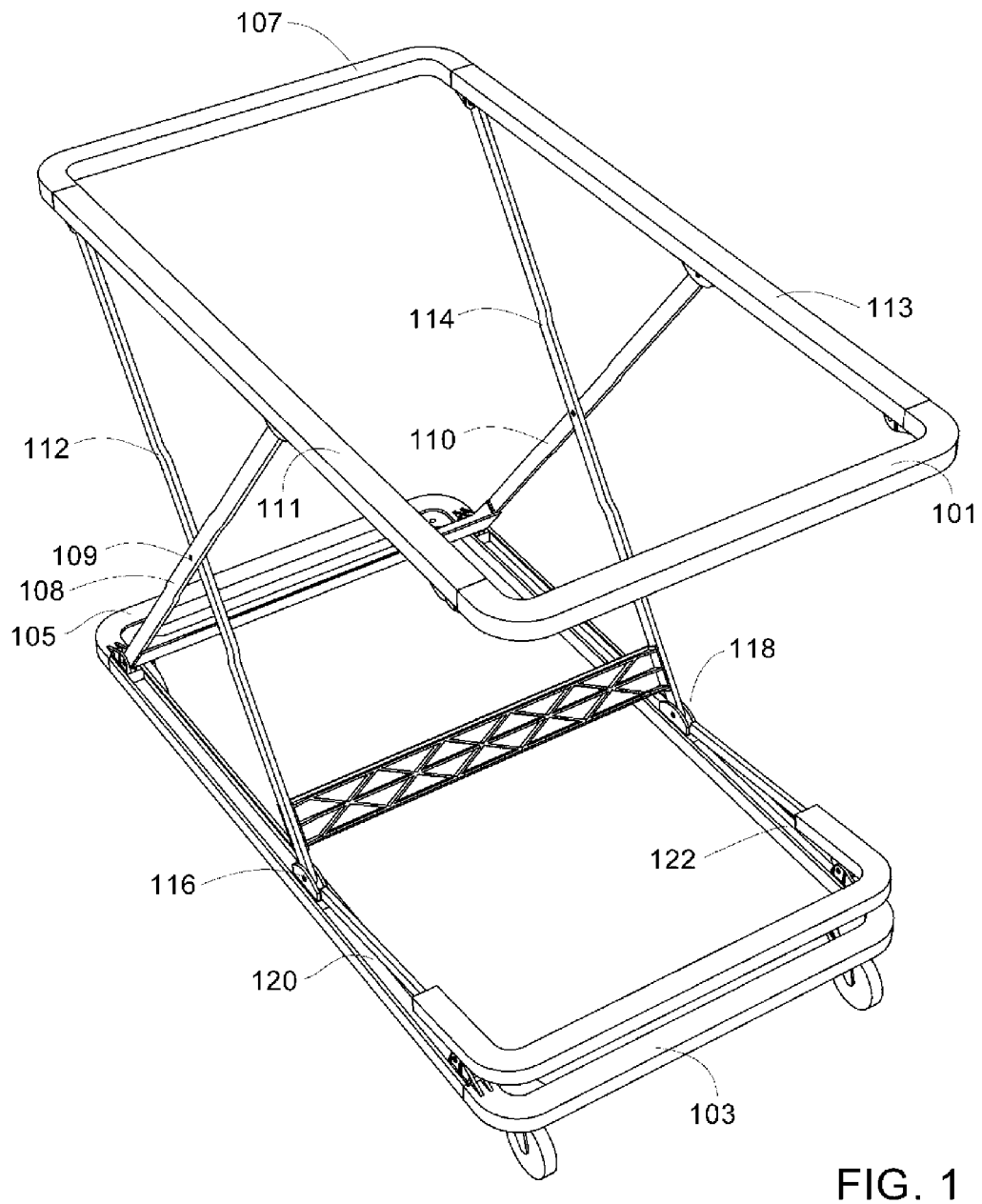
FIG. 1 depicts a perspective view of a first representative sample of a collapsible stackable storage cart in a fitly elevated configuration and without a storage receptacle.

Reference now should be made to the drawings, in which the same reference numbers are used throughout the different figures to designate the same components.

It will be understood that, although the terms first, second, third, etc. may be used herein to describe various elements, these elements should not be limited by these terms. These terms are only used to distinguish one element from another element. Thus, a first element discussed below could be termed a second element without departing from the teachings of the present disclosure.

The terminology used herein is for the purpose of describing particular embodiments only and is not intended to be limiting. As used herein, the singular forms "a" "an", and "the" are intended to include the plural forms as well, unless the context clearly indicates otherwise. It will be further understood that the terms "comprising", "including" or "having", and any derivative of any of those terms, when used in this specification, specify the presence of stated features, regions, integers, steps, operations, elements, and/or components, but do not preclude the presence or addition of one or more of the same.

In general, the invention disclosed herein includes (comprises) a cart for storing items when in a fully collapsed configuration and which can be stacked with another such cart, comprising a wheeled base supporting an elevation means supporting a receptacle, and an actuation mechanism governing the height of the receptacle. The wheeled base may be essentially any structural arrangement or substratum capable of forming a mobile base supporting elevation means. For example, the wheeled base may be at least one leg atop one or more wheels; or a plurality of legs, each of which may be anchored atop one or more wheels.

If each such leg(s) is an extendable leg, such leg(s) may constitute an elevation means. For example, each base leg(s) may have an extension leg in telescoping relationship with the base leg. Alternatively, the leg(s) may be hinge-folded, and unfolded for extension. Such hinge-folding may occur at essentially any place along the length of the leg(s) that will enable the leg(s) to provide the necessary extension.

Alternatively (and preferably), a wheeled base may include a platform or frame having a plurality of wheels in a stable configuration; such a platform will typically be the functional equivalent of such a frame, and may be considered the same.

The actuation mechanism governing the height of the receptacle (or the elevation means) may be any means of starting and stopping the raising and lowering of the height of the receptacle. Lifting mechanisms and related controls may be used, such as hydraulic or pneumatic means such as pistons and cylinders. Mechanical linkage(s) may be used as well, either with artificially powered lifting mechanisms or with raising and lowering accomplished manually.

One particular embodiment of the invention is a collapsible cart storing items when full, including a wheeled base comprising an actuation base-side 103 having opposite ends, an opposite base-side 105 having opposite ends, and a connecting base-frame comprising an essentially parallel pair of base guide tracks (120 and 122), each connecting a respective actuation base-side end to a respective opposite base-side end. The cart may also include a receptacle frame comprising an actuation upper side 101 having opposite ends, an opposite upper side 107 having opposite ends, and a connecting upper frame comprising an essentially parallel pair of upper guide tracks (111 and 113), each connecting a respective actuation upper side end to a respective opposite upper side end.

Also included may be a scissor extension apparatus attached to the wheeled base and comprising an essentially parallel duo of separate scissor-leg pairs, each such pair pivotally attached at a mid region, one such scissor-leg 108 having a static pivot end rotatably attached to a respective base guide track 120 and a movable end operatively coupled to a respective upper guide track 111; the other such scissor-leg 112 may having a static pivot end rotatably attached to the upper guide track 111 and a movable end operatively coupled to said base guide track 120. Operative coupling of a movable end to a guide track may be by any means satisfying the functional requirements, such as by a shoe slidable within a guide track, or a wheel bearing rollable within a guide track. The configuration of the upper guide track may be the same or similar to that of a base guide track, but with a downward orientation rather than an upward orientation. For example, each guide track may have essentially vertical side walls connected by an essentially horizontal strip, defining a channel. The opening of the channel may be adapted to retain or maintain the operable coupling, such as an overhang narrowing the channel opening.

Movement of the movable ends toward said respective static ends increases the height of the basket frame. An actuation mechanism governs the height of the basket in a raised configuration of the cart. The actuation mechanism may include a fulcrum member 115 anchored to the wheeled base (or a sub-element associated therewith), and an actuation lever having an actuation portion 123 (such as a pedal end) in cooperating engagement with the fulcrum member and, for each base guide track, an opposite end insertable within the guide track to stop movement of the respective scissor-leg movable end toward the actuation base-side. The actuation lever may be an essentially U-shaped configuration, with the fulcrumatic engagement nearer the base of the U and with each end of the U, when inserted into the respective guide track, essentially acting like a chock when in contact with whatever is operatively coupled to the movable end of the respective scissor-leg. One or more of the upper guide tracks may also have a stop member to stop continued lowering of the receptacle below a desired height, or to stop continued lowering of the receptacle while in the fully collapsed configuration.

The cart may further include an open-top receptacle enclosure 202 between both pairs of scissor-legs, supported by the receptacle frame.

In a more specific version of the cart:

(a) one of the upper guide tracks connects the actuation upper side end to the second upper side end, the other of the upper guide tracks connects the actuation upper side opposite end to the second upper side opposite end;

(b) one of the base guide tracks connects the actuation base-side end to the second base-side end, the other of the base guide tracks connects the actuation base-side opposite end to the second base-side opposite end; and (c) the wheeled base further may include, at each such corner connection of a base-side and guide track, a castered wheel mounted near the connection and rotatable to be positionally inset in relation to an upper side of another of such cart when stacking occurs.

FIG. 1 depicts a perspective view of a first representative embodiment of a collapsible stackable storage cart 100 in a fully elevated configuration and without a storage receptacle. The collapsible stackable storage cart includes a wheeled base and a scissor extension apparatus that is attached to the wheeled base. The collapsible stackable storage cart 100 also includes a receptacle (or basket) frame attached to the scissor extension apparatus. Such an apparatus may be in the form of a single pair of scissor-legs (also called cross members), or a plurality of pairs of scissor-legs. The embodiment of FIG. 1 includes a scissor extension apparatus that includes two separate pairs of first and second scissor-legs, each such pair pivotally attached at a mid region. For one such pair, the first scissor-leg 108 may have a static pivot end rotatably attached to a respective base guide track 120, and a movable end operatively coupled to a respective upper guide track 111; the second scissor-leg 112 may have a static pivot end rotatably attached to the upper guide track 111, and a movable end operatively coupled to the base guide track 120. Movement of the movable ends toward the respective static ends increases the height of the basket frame.

In other words, in some implementations of the dual scissor-leas embodiment of the collapsible stackable storage cart, the scissor extension apparatus includes a pair of essentially parallel cross members 108 and 110 having a static pivot end rotatably attached to the wheeled base, preferably at an end of a respective base guide track opposite the actuation end; the opposite end of each is operatively coupled to a respective upper guide track on the underside of the receptacle frame, preferably nearer the upper actuation end of the receptacle frame. Pivotally attached near the center point of each such cross member is a respective second cross member, having a static pivot end rotatably attached to the upper guide track 111, and a movable end operatively coupled to the base guide track 120. In some implementations of the collapsible stackable storage cart, the operative couplings of the second cross members 112 and 114 are slidable attachment to the wheeled base, especially a lateral guide track portion thereof. The cross members 112 and 114 may be slidably attached to the wheeled base by shoes 116 and 118, respectively, that slide along guide tracks 120 and 122, respectively, in the wheeled base. Another alternative operative coupling is by way of roller bearings.

Each of the first cross members 108 and 110 are rotatably attached at a mid region to one of the other cross members 112 and 114, respectively. For example, cross member 108 is rotatably attached to cross member 112 and cross member 110 is rotatably attached to cross member 114.

Figure 2:
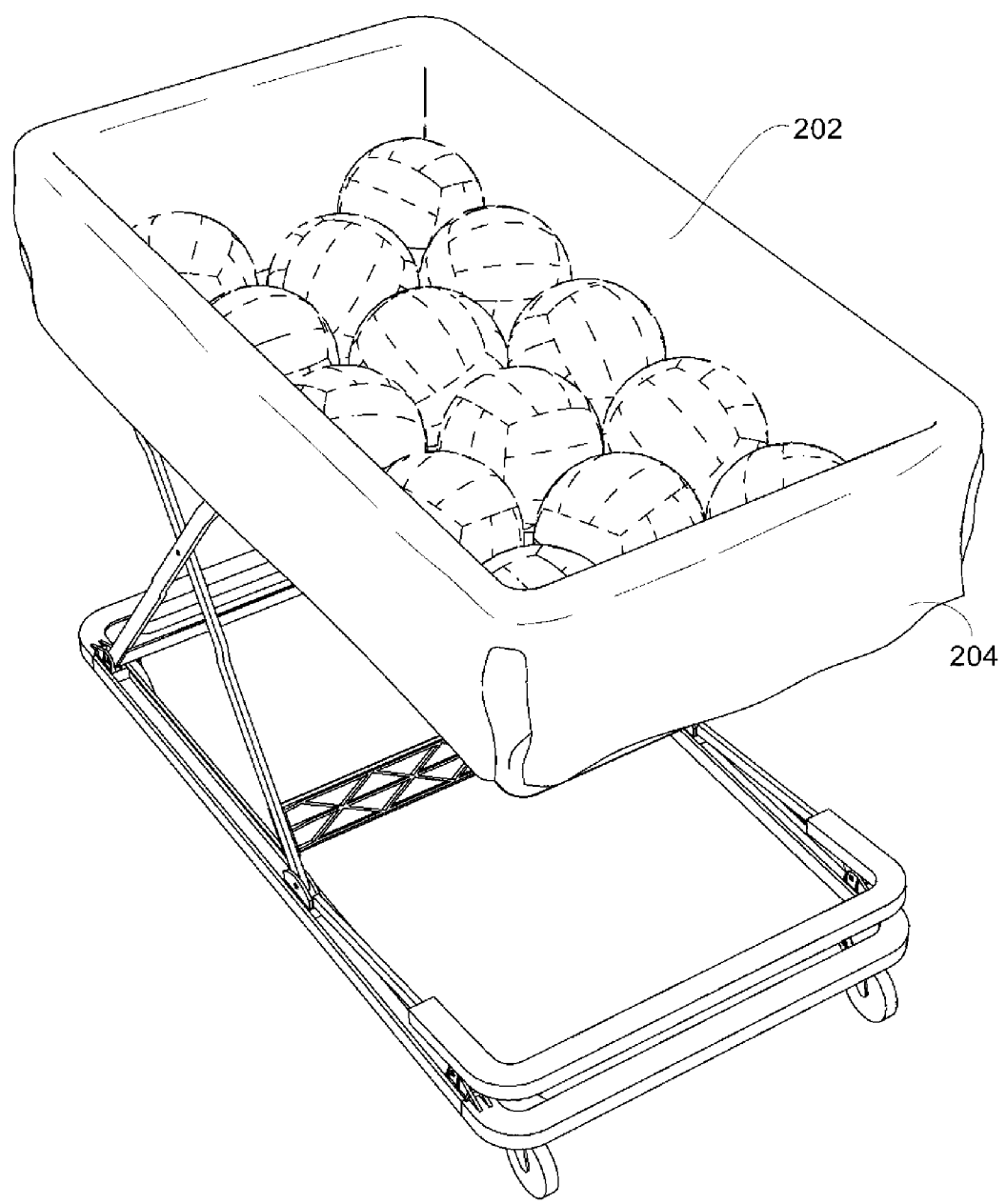
FIG. 2 depicts a perspective view of the embodiment of FIG. 1, with a storage receptacle.
Figure 3:
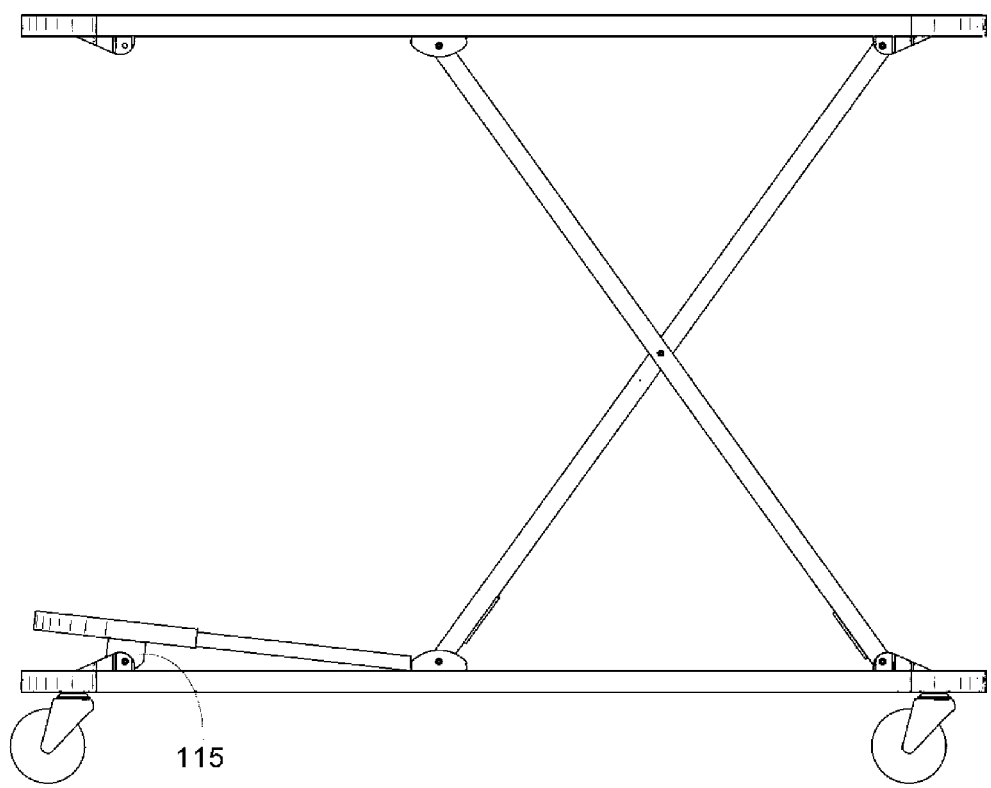
FIG. 3 depicts a first side elevation view of the cart of FIG. 1.

FIG. 2 depicts a perspective view of the embodiment of FIG. 1, with a storage receptacle. The storage receptacle 202 shown in FIG. 2 hangs from the basket frame with a skirt 204 on the outside of the basket frame. In the example shown in FIG. 2, the storage receptacle 202 is constructed from fabric. However, any construction material will suffice so long as it satisfies the functional requirement of holding items for storage.

Figure 5:
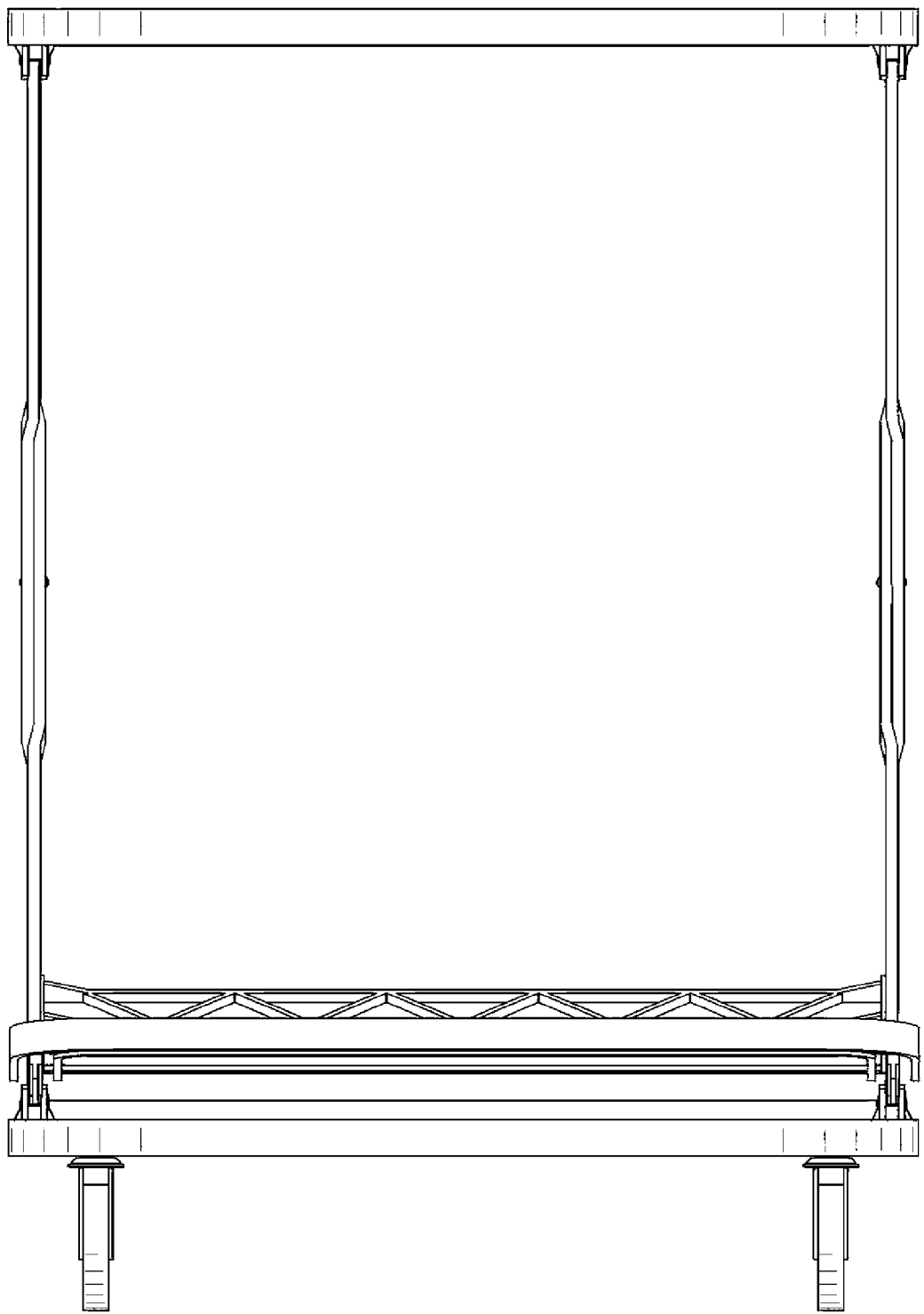
FIG. 5 depicts an elevation view of the cart of FIG. 1, from the actuation end.

FIG. 5 depicts an elevation view of the collapsible stackable storage cart of FIG. 1, from the actuation end. The actuation end of the cart is the end of the cart from which an operator actuates the raising/lowering mechanism.

Figure 6:
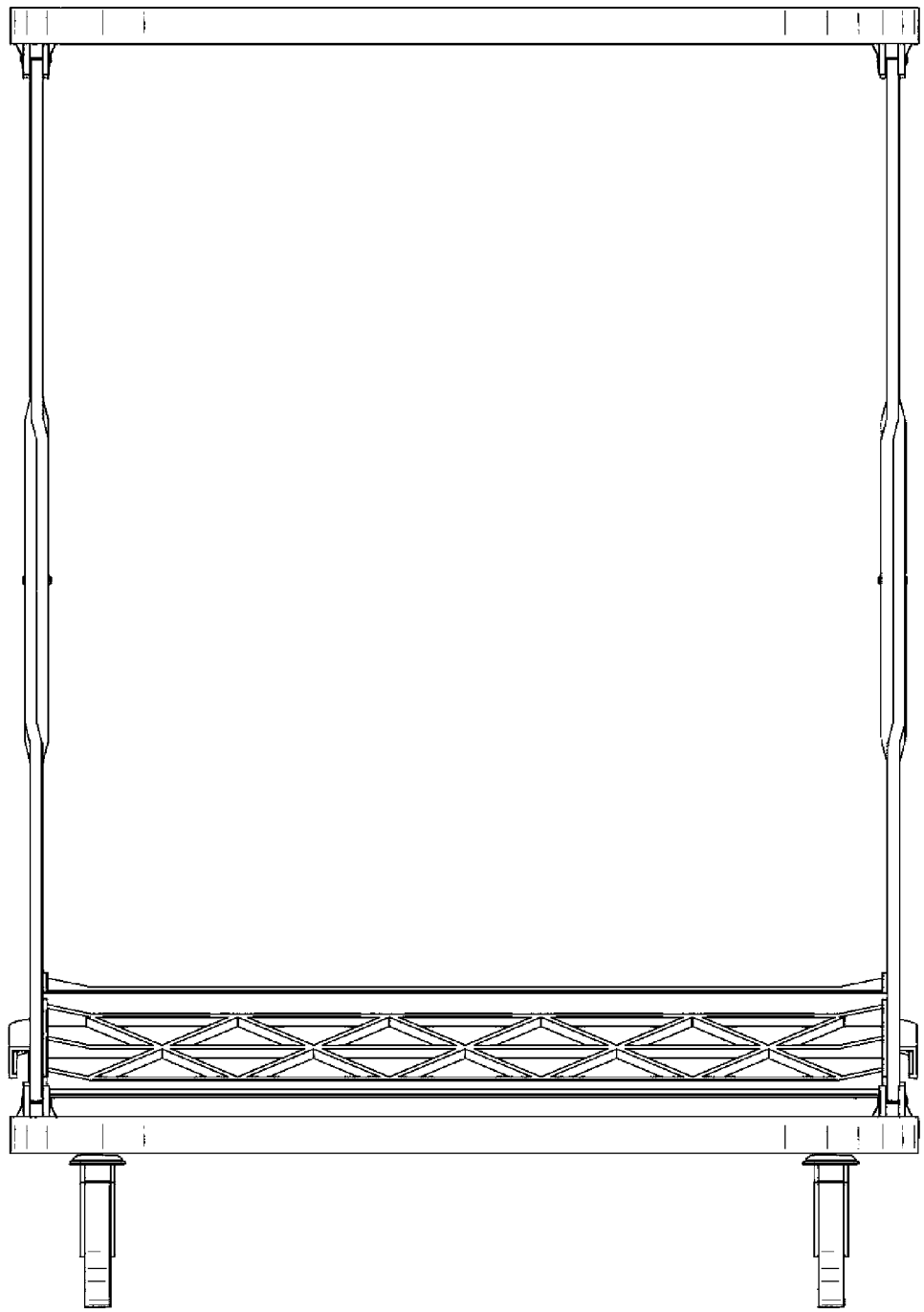
FIG. 6 depicts an elevation view of the cart of FIG. 1, from the end opposite to the end opposite the actuation end.
Figure 7:
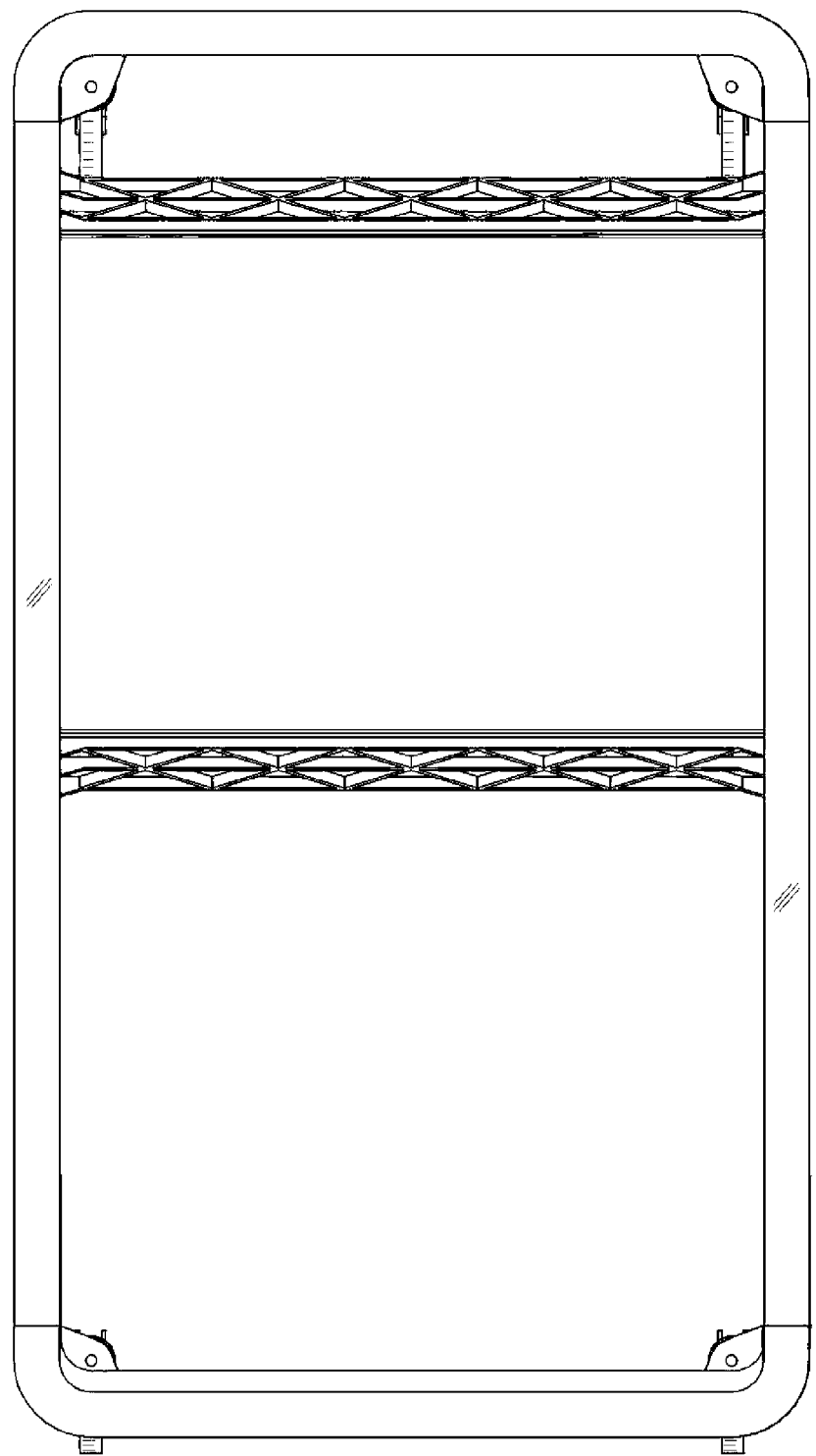
FIG. 7 depicts a top plan view of the cart of FIG. 1.
Figure 8:
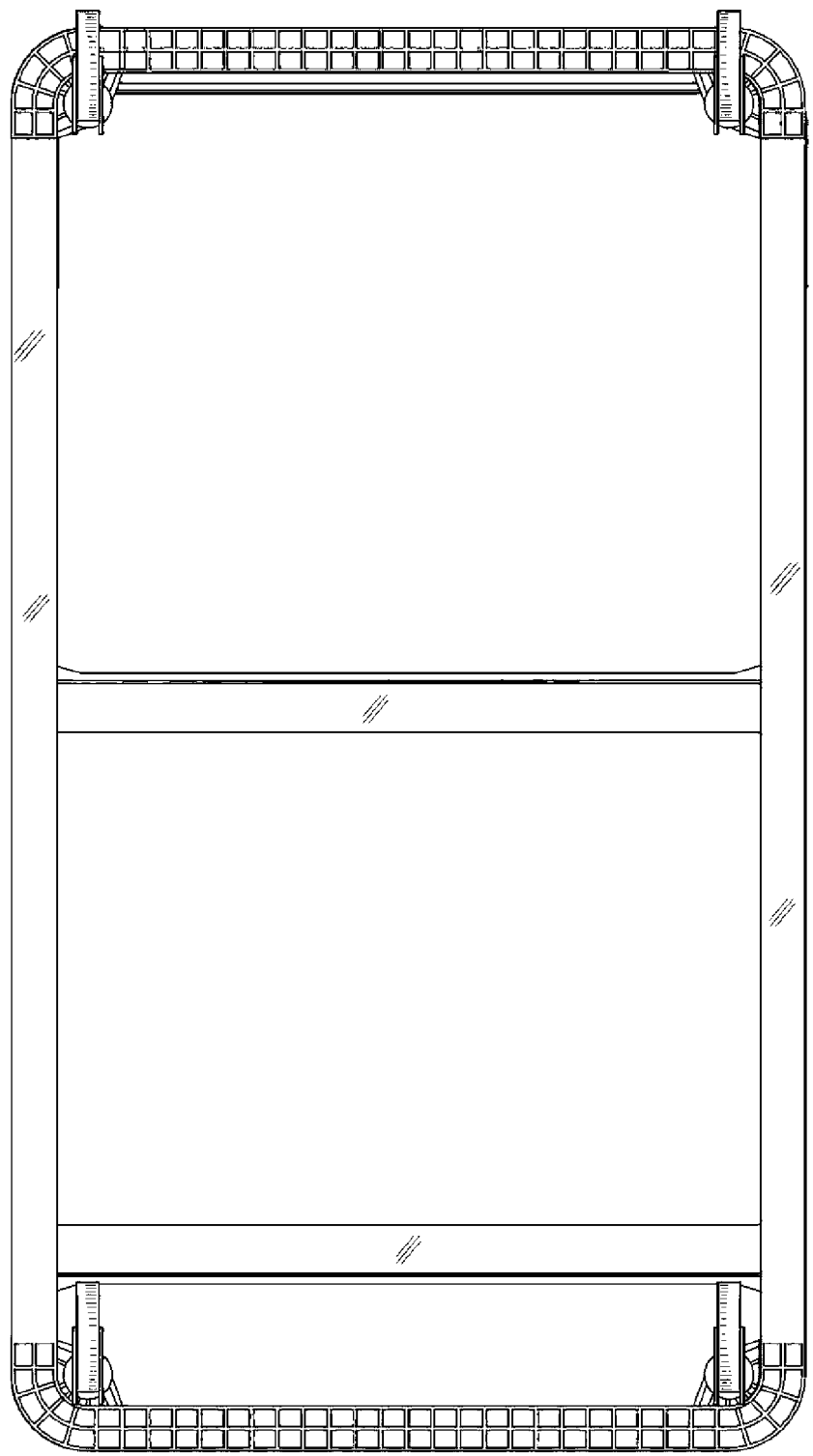
FIG. 8 depicts a bottom plan view of the cart of FIG. 1.

FIG. 6 depicts an elevation view of the collapsible stackable storage cart of FIG. 1, from an end opposite the actuation end. In some implementations of the collapsible stackable storage cart, the wheeled base includes four castered wheels each positionally inset relative to the respective inner corner of the receptacle frame; the two wheels at the top of this figure are inset.

Figure 4:
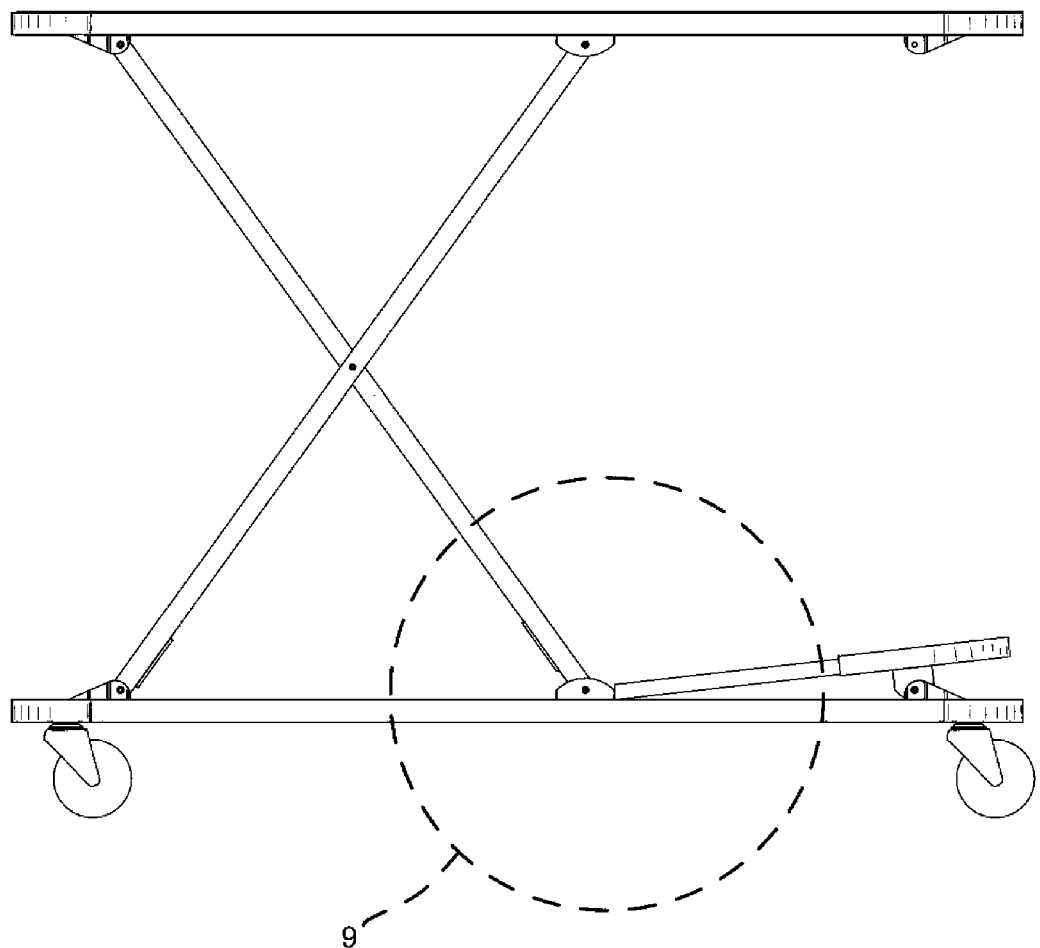
FIG. 4 depicts a second side elevation view of the cart of FIG. 1.
Figure 9:
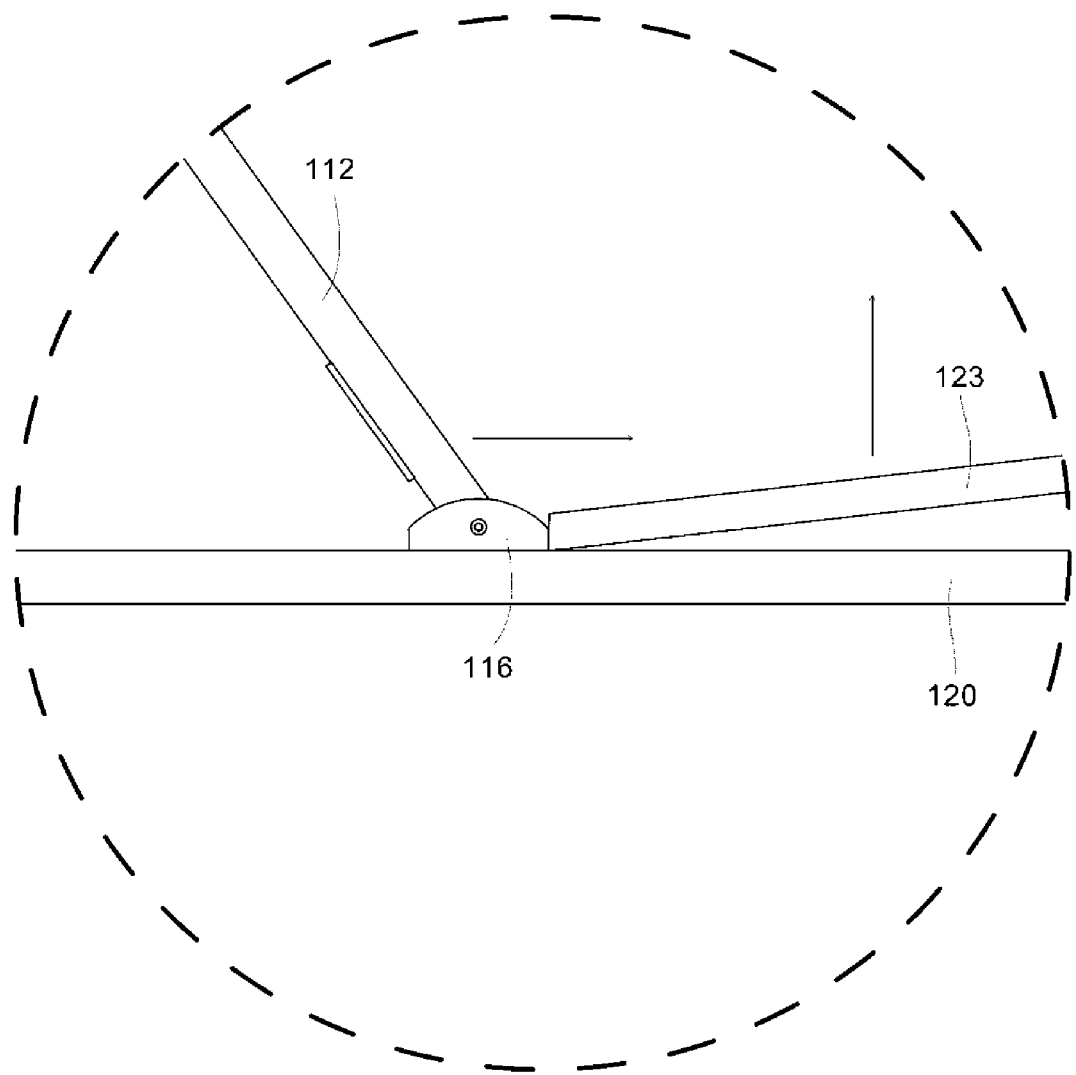
FIG. 9 depicts a close-up view of the encircled portion of FIG. 4.
Figure 10:
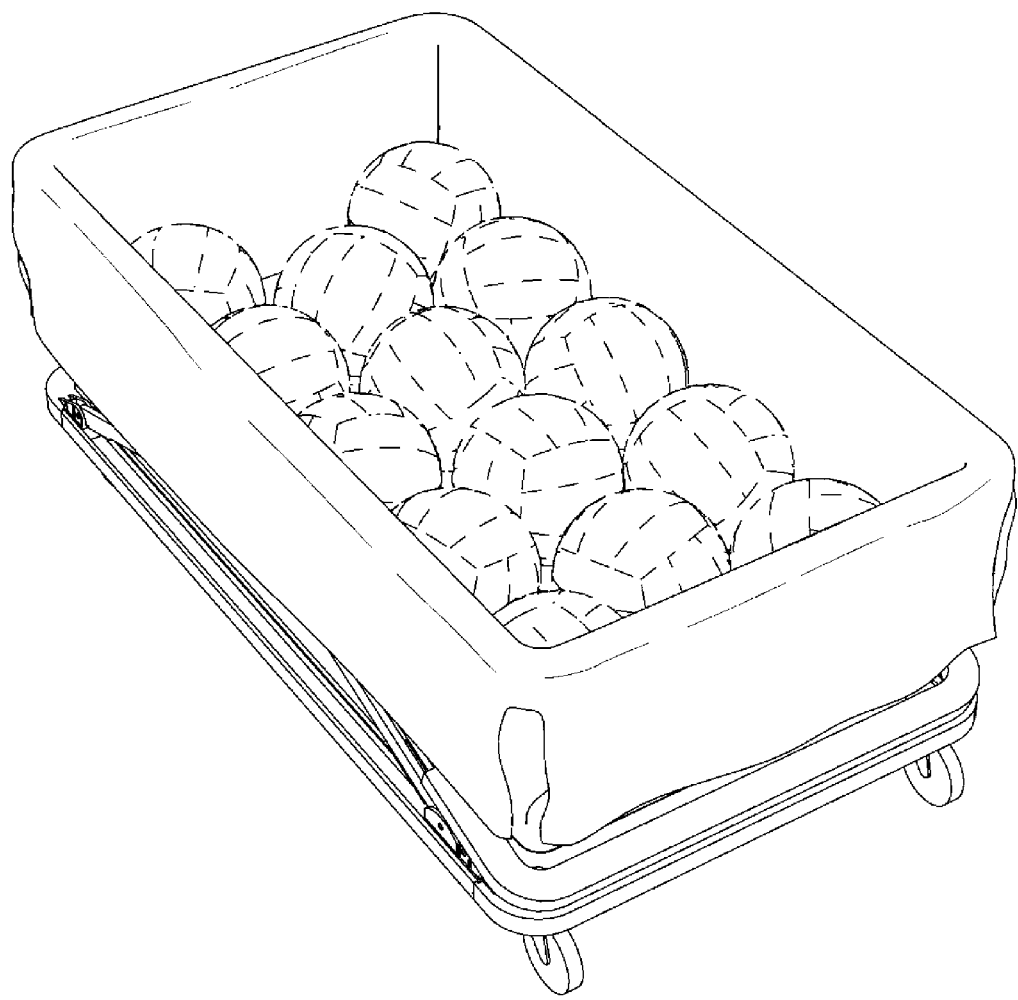
FIG. 10 depicts a perspective view of the cart of FIG. 2, in a fully collapsed configuration.
Figure 11:
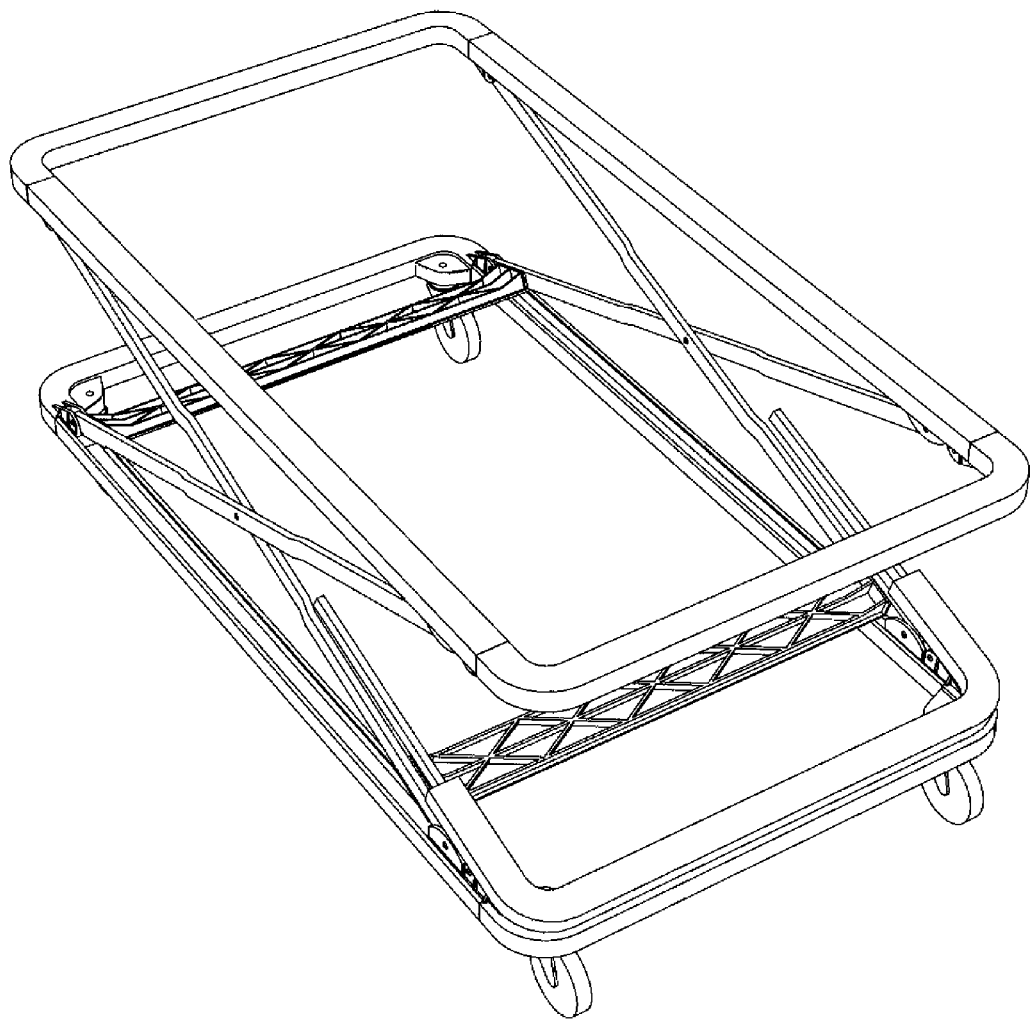
FIG. 11 depicts a perspective view of the embodiment of FIG. 10, with the storage receptacle removed.
Figure 12:
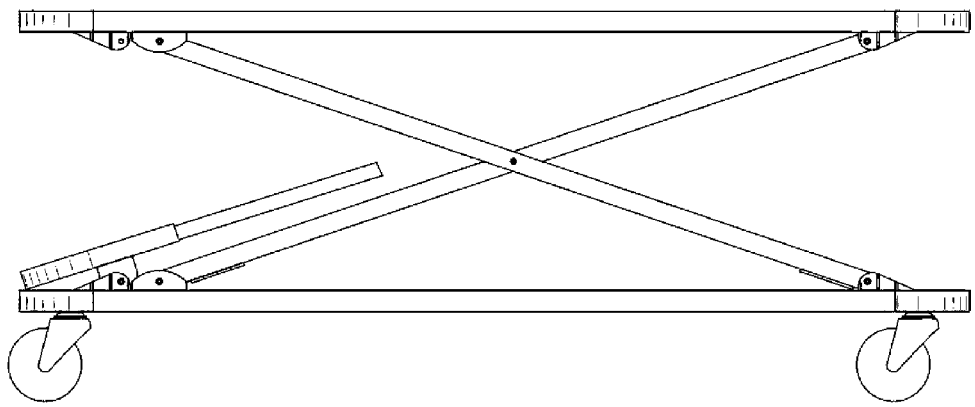
FIG. 12 depicts a first side elevation view of the cart of FIG. 11.
Figure 13:
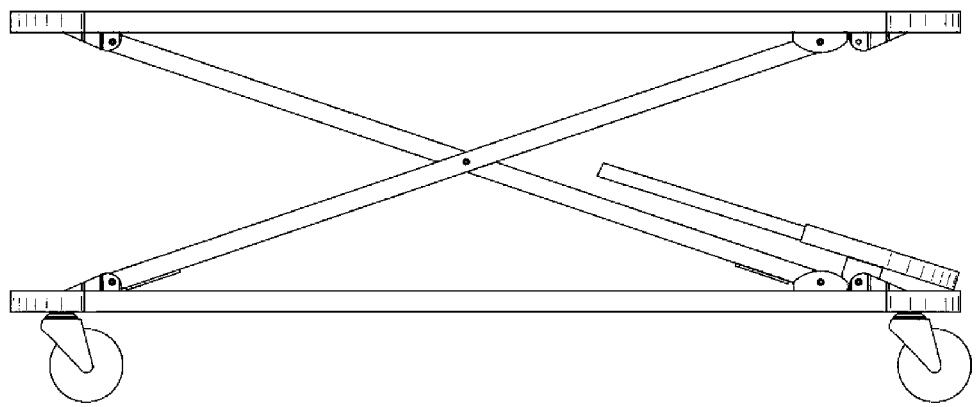
FIG. 13 depicts a second side elevation view of the cart of FIG. 11.
Figure 14:
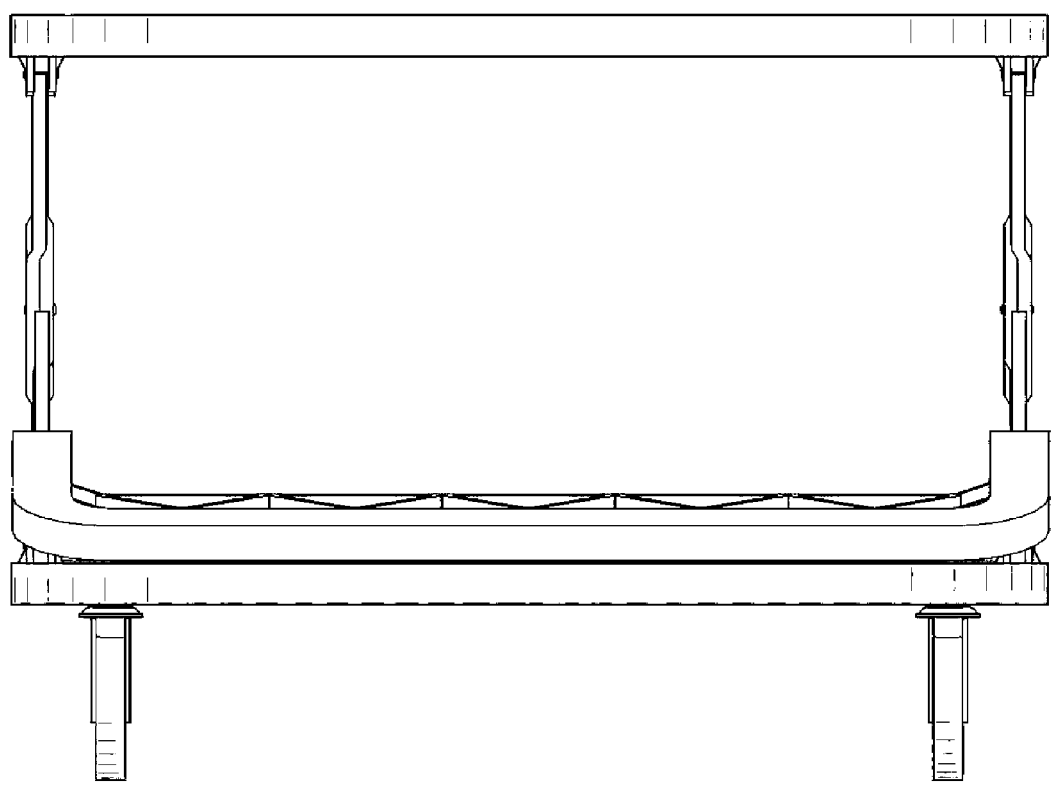
FIG. 14 depicts an elevation view of the cart of FIG. 11, from the actuation end.
Figure 15:
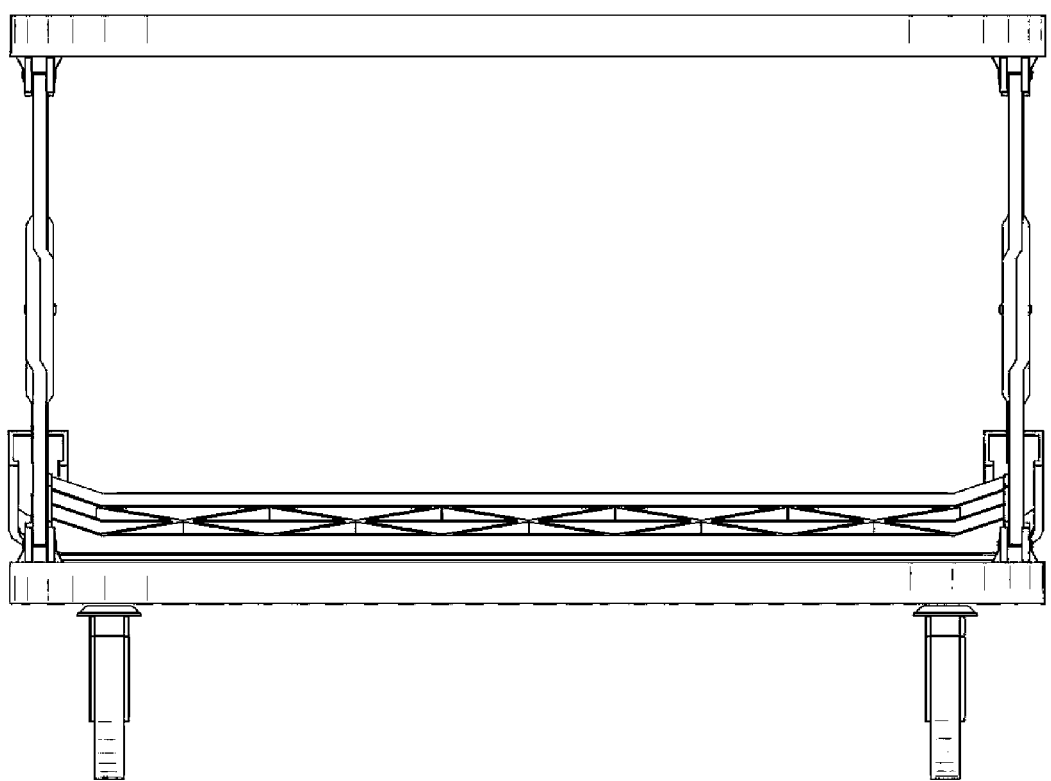
FIG. 15 depicts an elevation view of the cart of FIG. 11, from the end opposite the actuation end.
Figure 16:
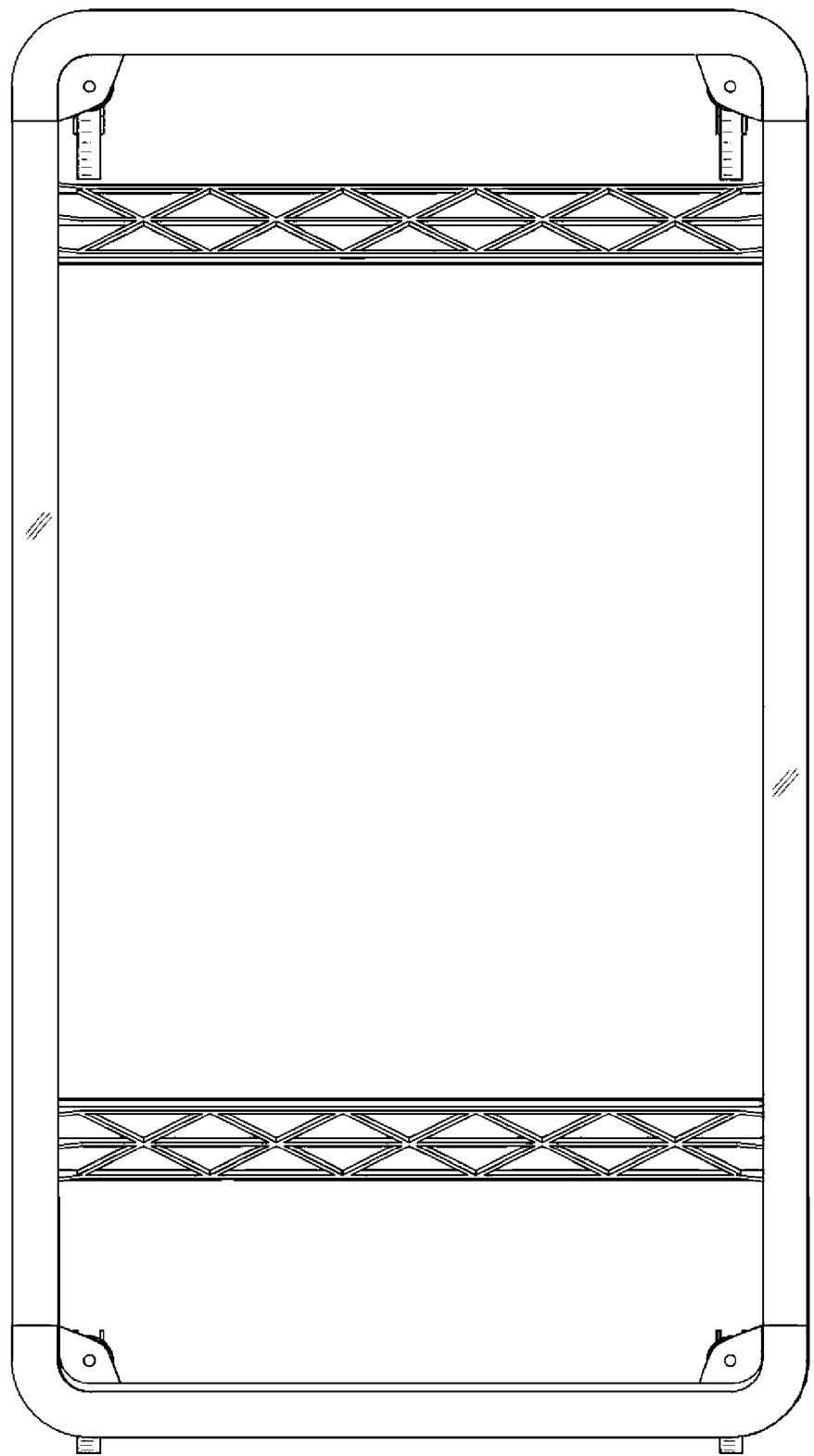
FIG. 16 depicts a top plan view of the cart of FIG. 11.
Figure 17:
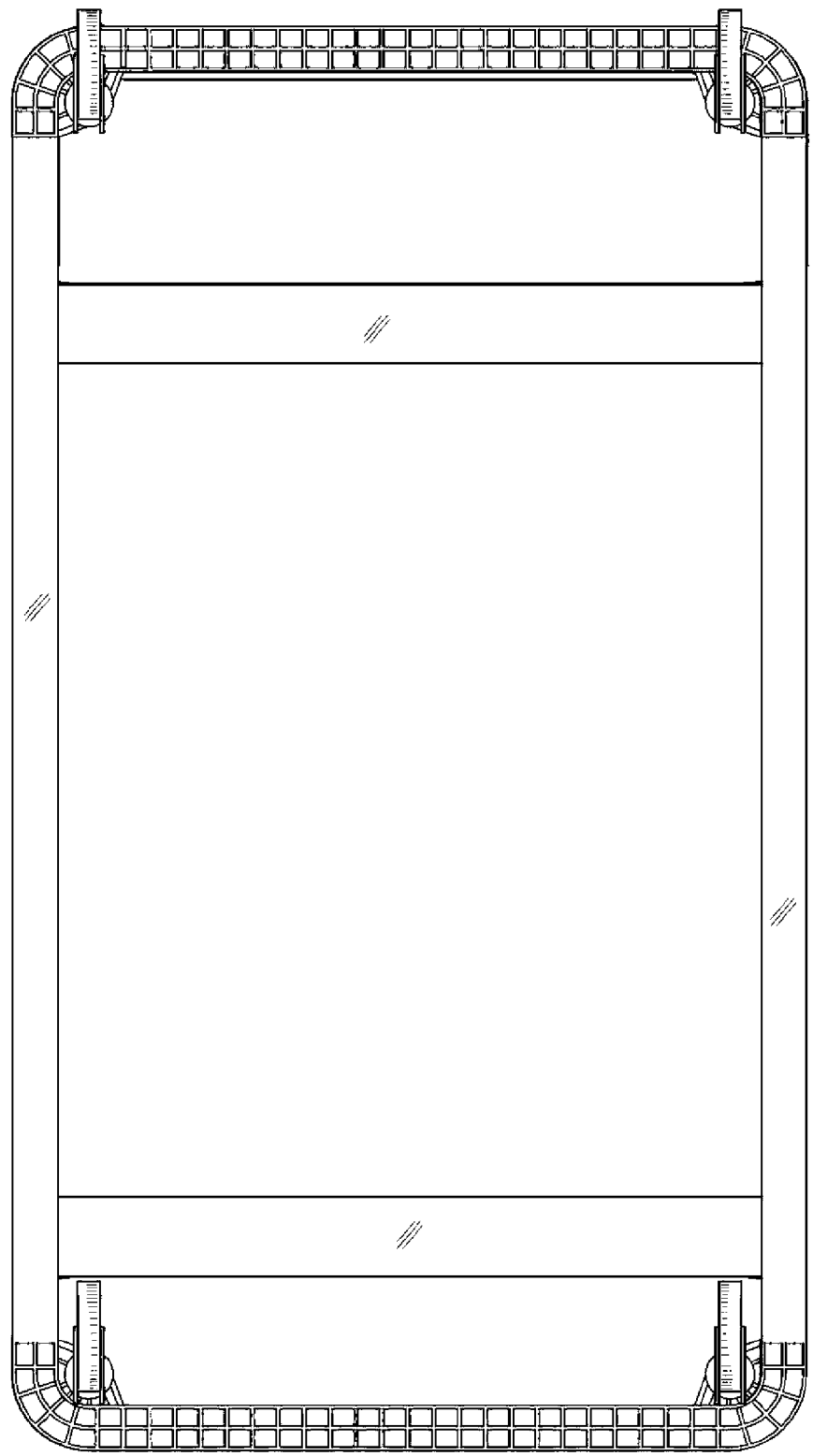
FIG. 17 depicts a bottom plan view of the cart of FIG. 11.

FIG. 9 depicts a close-up view of the portion encircled in FIG. 4, including a shoe 116 within a base guide-track 120, and the end of an actuation mechanism inserted into the guide track to stop movement of the scissor leg toward the actuation end; the arrow shows the direction of shoe movement that will cause the scissor apparatus to raise the receptacle frame.

Figure 18:
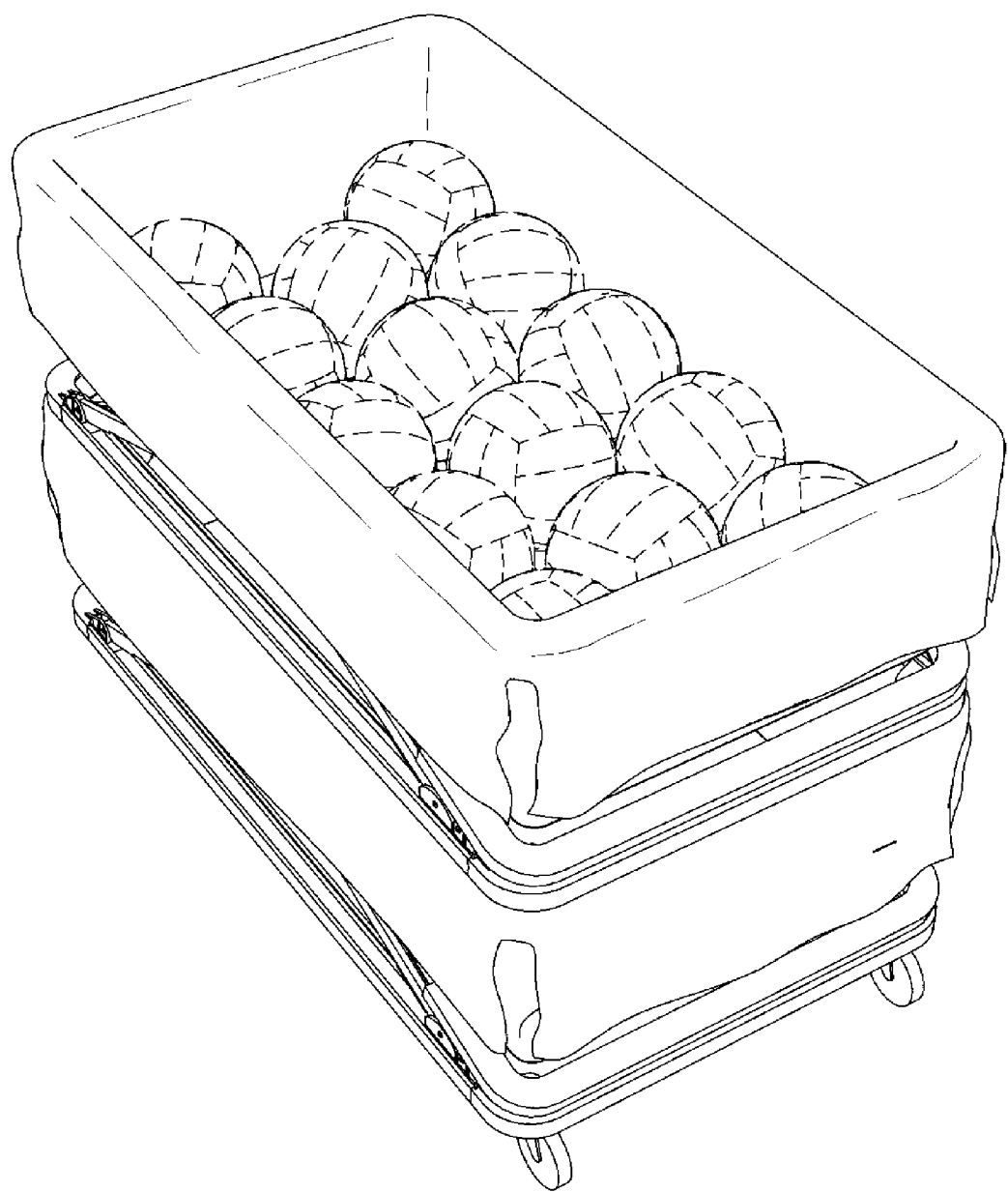
FIG. 18 depicts a perspective view of the cart of FIG. 10, stacked atop a second such cart.
Figure 19:
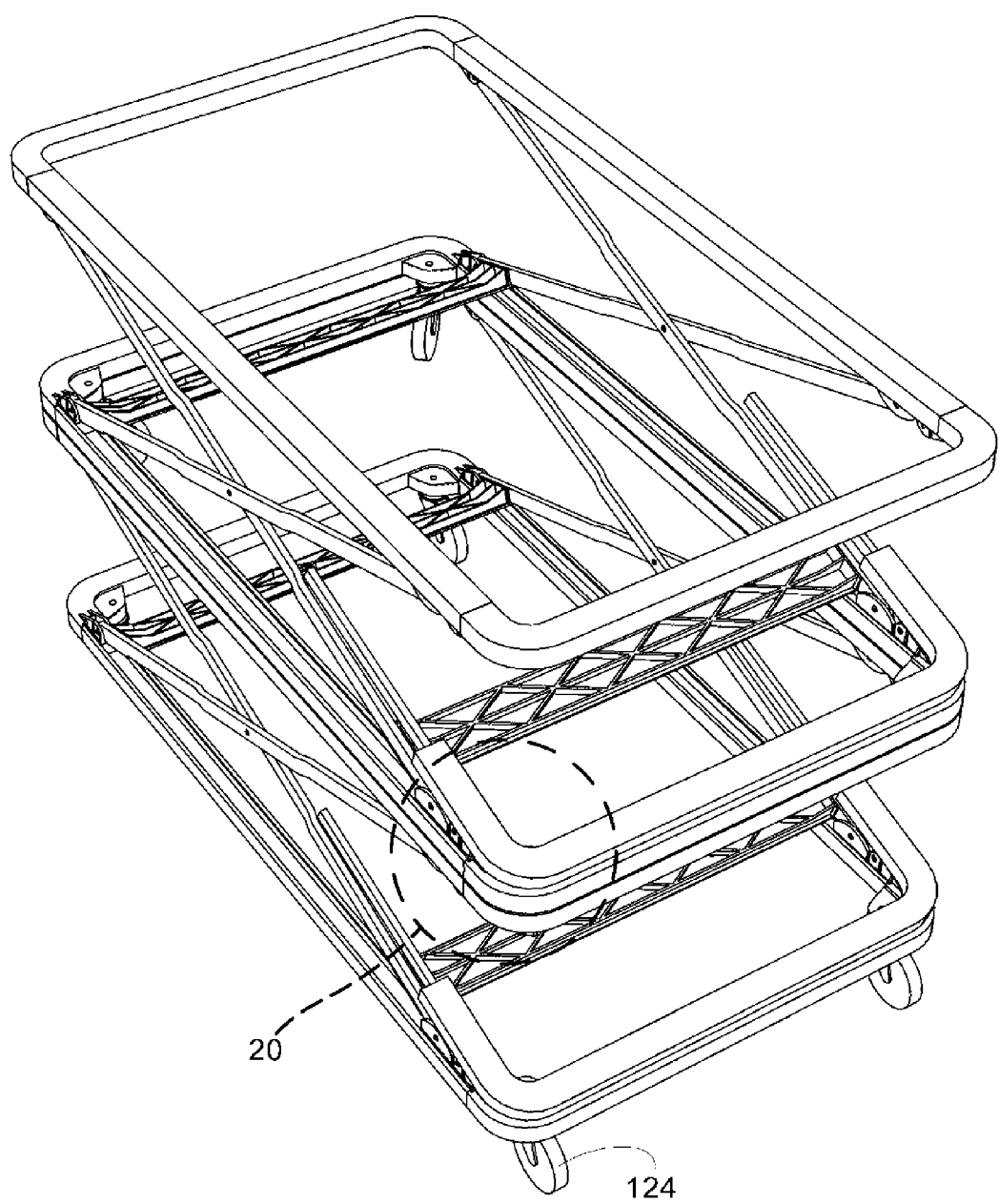
FIG. 19 depicts a perspective view of the carts of FIG. 18, with the storage receptacles removed.

FIG. 19 depicts a perspective view of the stacked carts of FIG. 18. Although the bottom wheels 124 are shown in one orientation, each wheel is castered independently of the other wheels, so that each wheel is capable of rotating 360 degrees. When stacking one cart atop another, this facilitates the nesting of each wheel inside the angle of each corner of the receptacle frame of the cart below. Such nesting maintains the alignment of the carts, both in the front-to-back direction and in the side-to-side direction.

Figure 20:
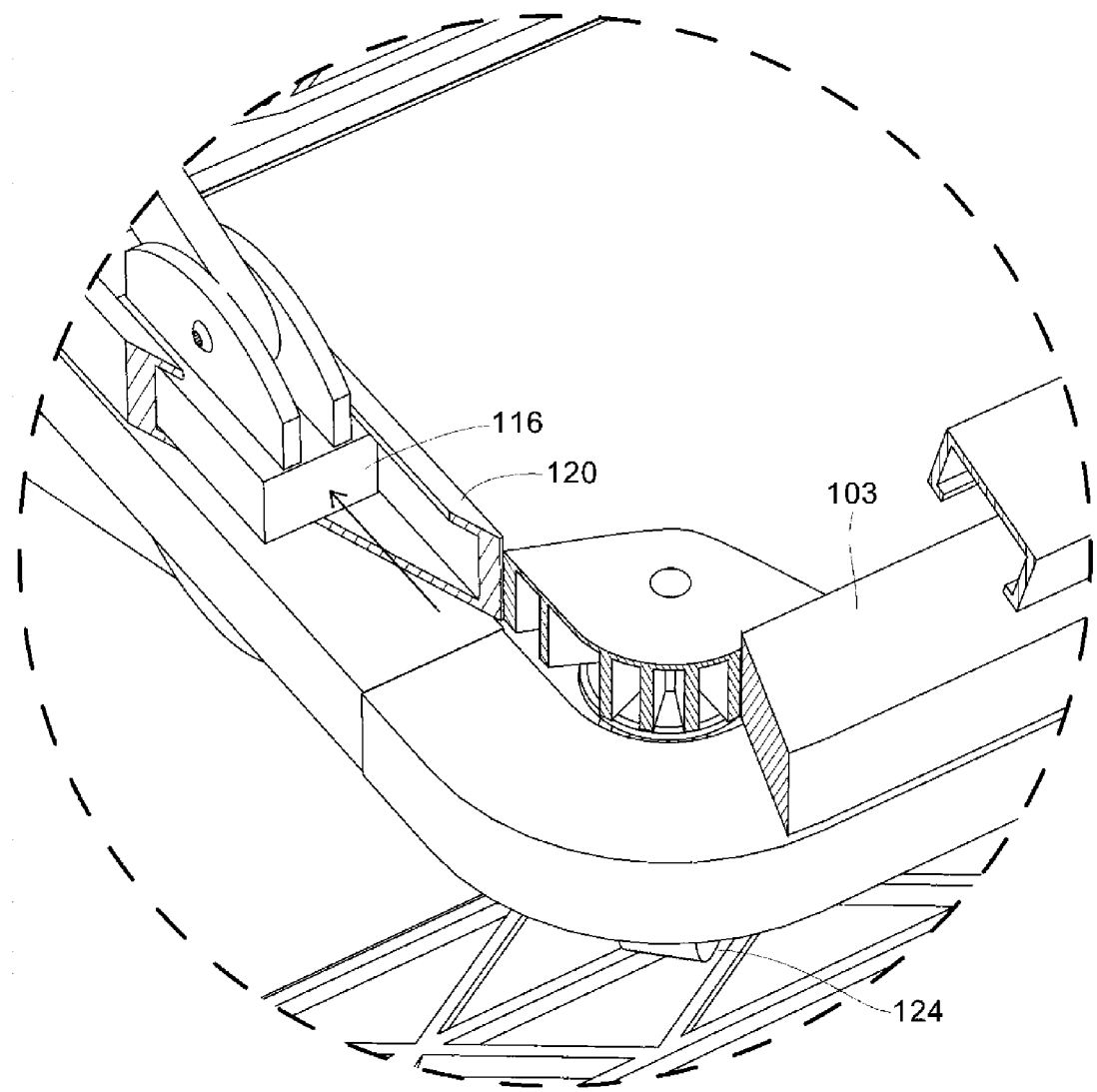
FIG. 20 depicts a close-up view of the portion encircled in FIG. 19, with a portion of the base-side and base guide track of the top cart removed.

FIG. 20 depicts a close-up view of the portion encircled in FIG. 19, with a portion of the actuation base-side 103 and a base guide track 120 of the top cart removed. The arrow shows the direction of shoe movement that will cause the scissor apparatus to raise the receptacle frame.

Figure 21:
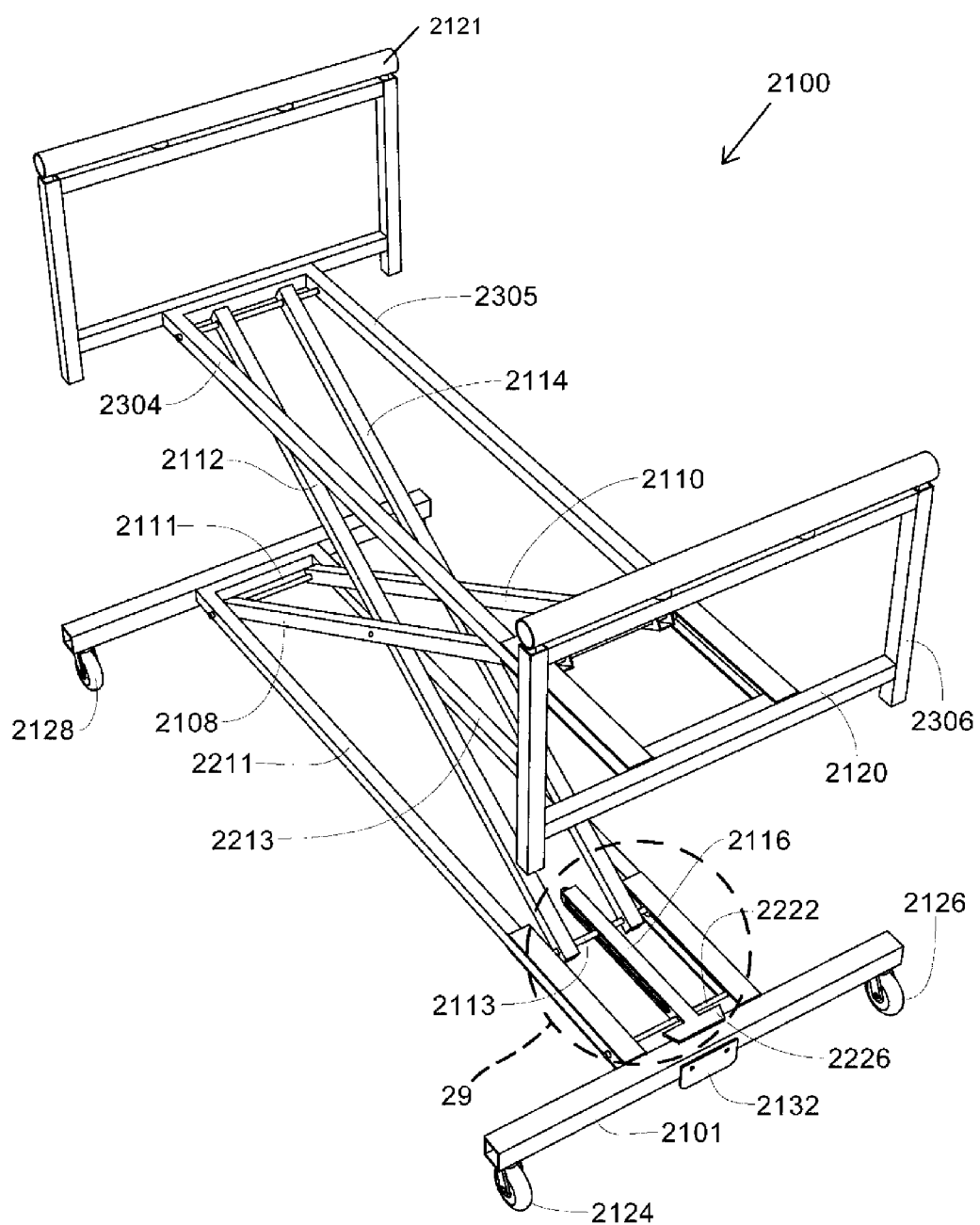
FIG. 21 depicts a perspective view of a second representative embodiment of a collapsible stackable storage cart in a fully elevated configuration and without a storage receptacle.

FIG. 21 depicts a perspective view of a second representative embodiment of a collapsible stackable storage cart 2100 in a fully elevated configuration, with storage receptacle removed. The collapsible stackable storage cart includes a wheeled base having a pair of medial base guide tracks (2211 and 2213), preferably essentially equidistant from a central axis between the base-sides. This cart may also include a scissor extension apparatus similar to that of the earlier embodiment, that is attached to the wheeled base. The collapsible stackable storage cart includes a basket frame attached to the scissor extension apparatus and including a pair of medial upper guide tracks (2304 and 2305), preferably essentially equidistant from a central axis between the base-sides.

In some implementations of the collapsible stackable storage cart, the scissor extension apparatus includes two cross members (2108 and 2110) that are rotatably attached to the wheeled base through a singular pivot member 2111. In some implementations of the collapsible stackable storage cart, the scissor extension apparatus includes two other cross members 2112 and 2114 that are slidably attached to the wheeled base, preferably near the end of a respective medial base guide track opposite the actuation end of the wheeled base. The other ends of the cross members 2112 and 2114 may be slidably yoked to the wheeled base by a notched member 2116 pivotally attached to the wheeled base.

Each one of the two cross members 2108 and 2110 are pivotally attached to one of the two other cross members 2112 and 2114, respectively. For example, cross member 2108 is rotatably attached to cross member 2110 and cross member 2110 is rotatably attached to cross member 2114.

In some implementations of the collapsible stackable storage cart 2100, four castered wheels (2124, 2126, 2128 and 2130) are positionally outset in relation to the basket frame 2106. Wheel 2130 is obscured by other structure.

Some implementations of the collapsible stackable storage cart include a tab 2132 attached to a base-side of the wheeled base, either on an outer face or an inner face, and preferably along a longitudinal center axis.

Figure 23:
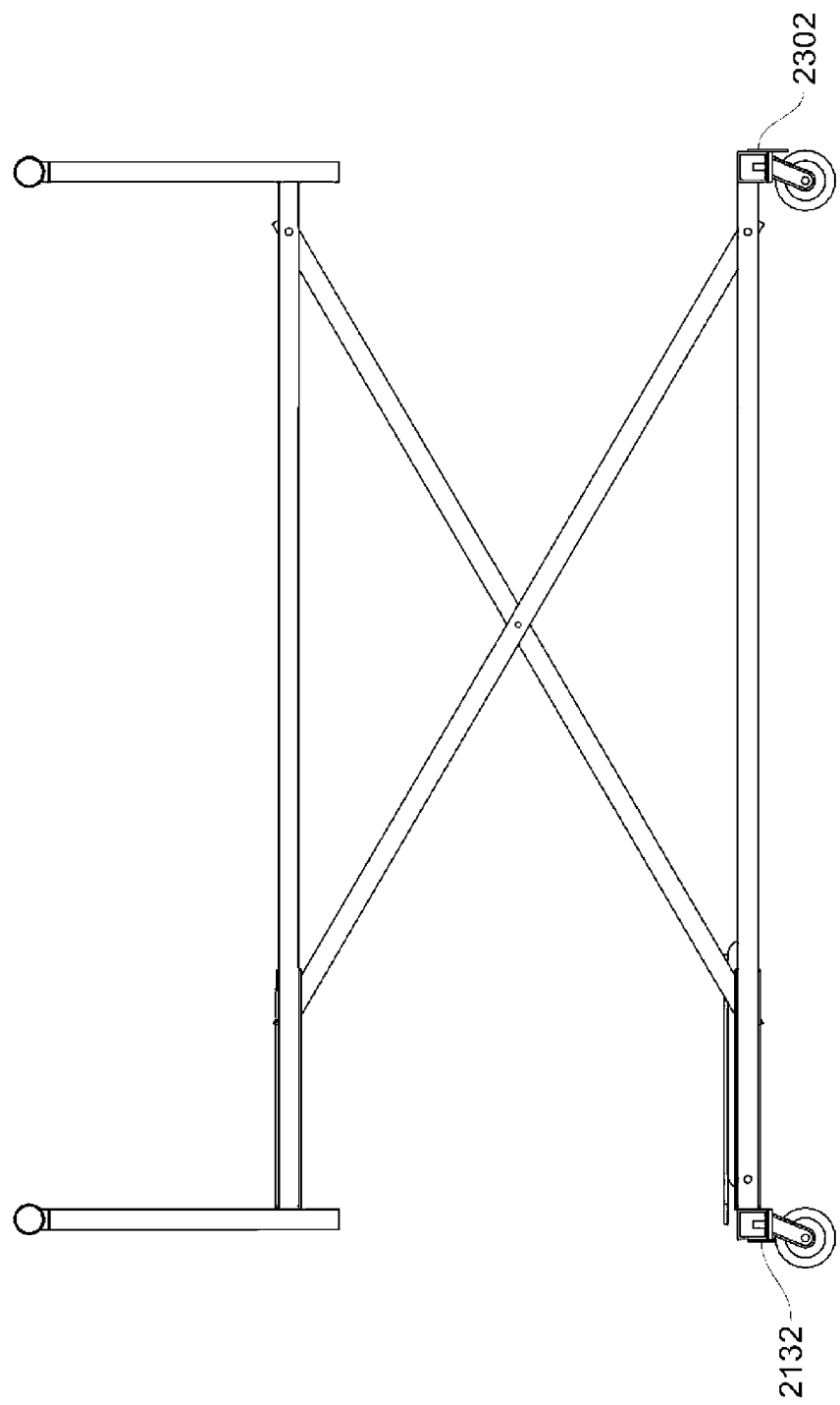
FIG. 23 depicts a first side elevation view of the cart of FIG. 21.
Figure 24:
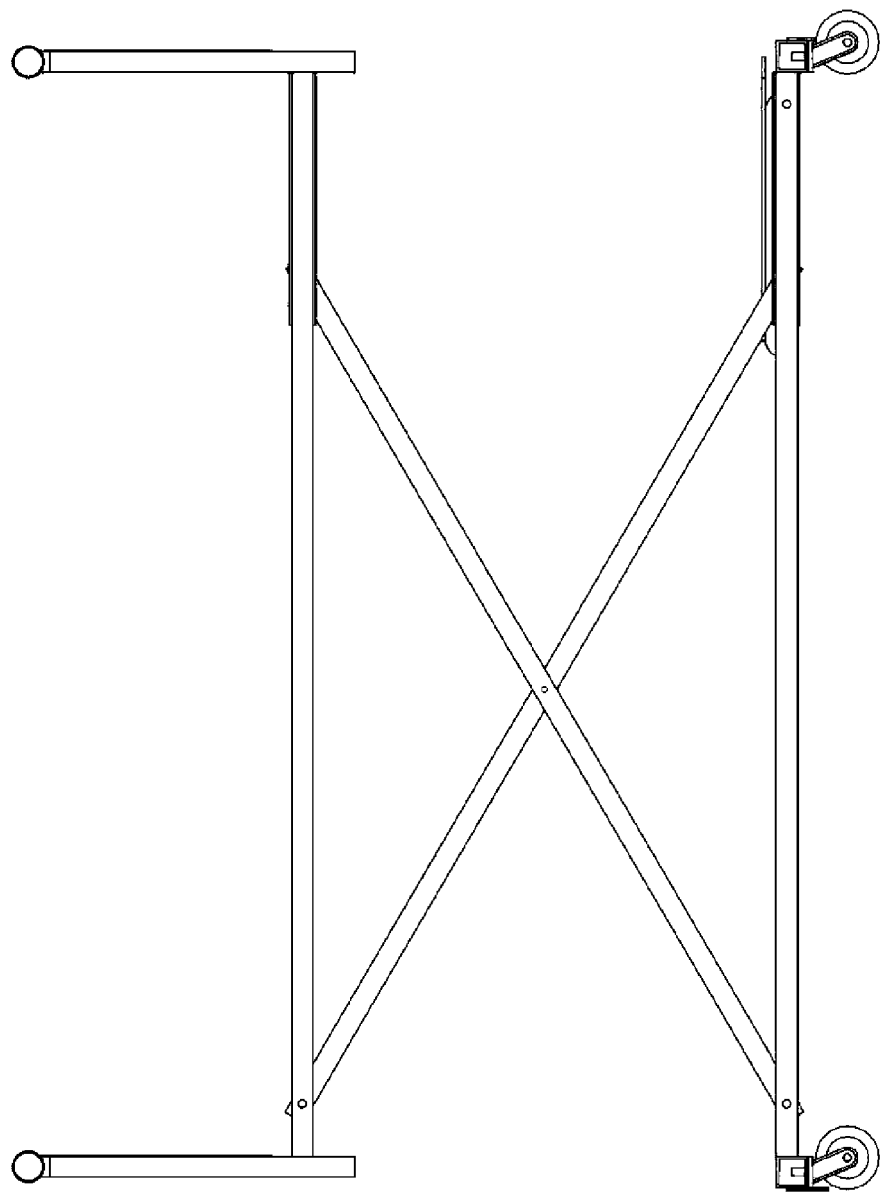
FIG. 24 depicts a second side elevation view of the cart of FIG. 21.
Figure 25:
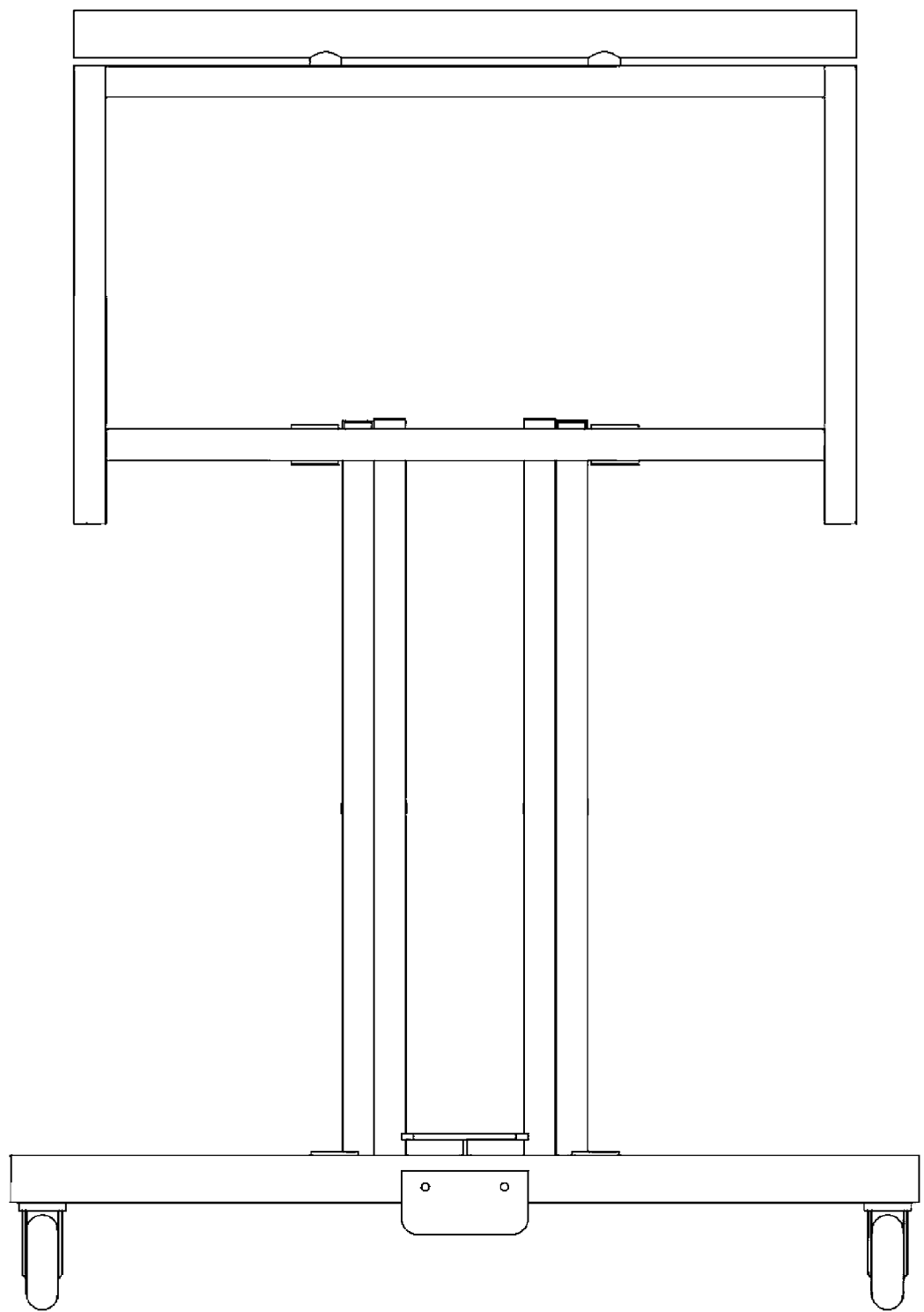
FIG. 25 depicts an elevation view of the cart of FIG. 21, from the actuation end.
Figure 26:
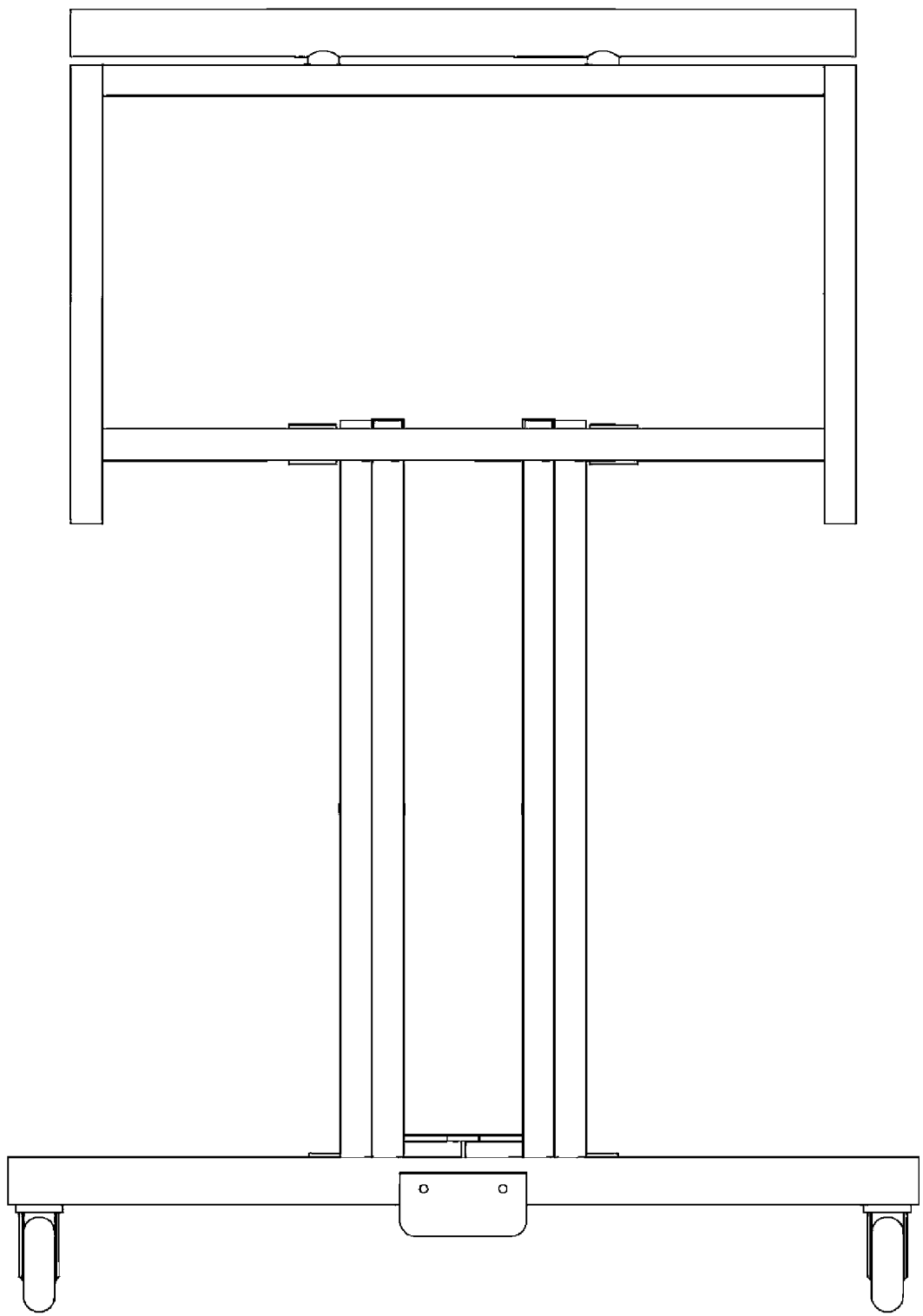
FIG. 26 depicts an elevation view of the cart of FIG. 21, from the end opposite the actuation end.
Figure 27:
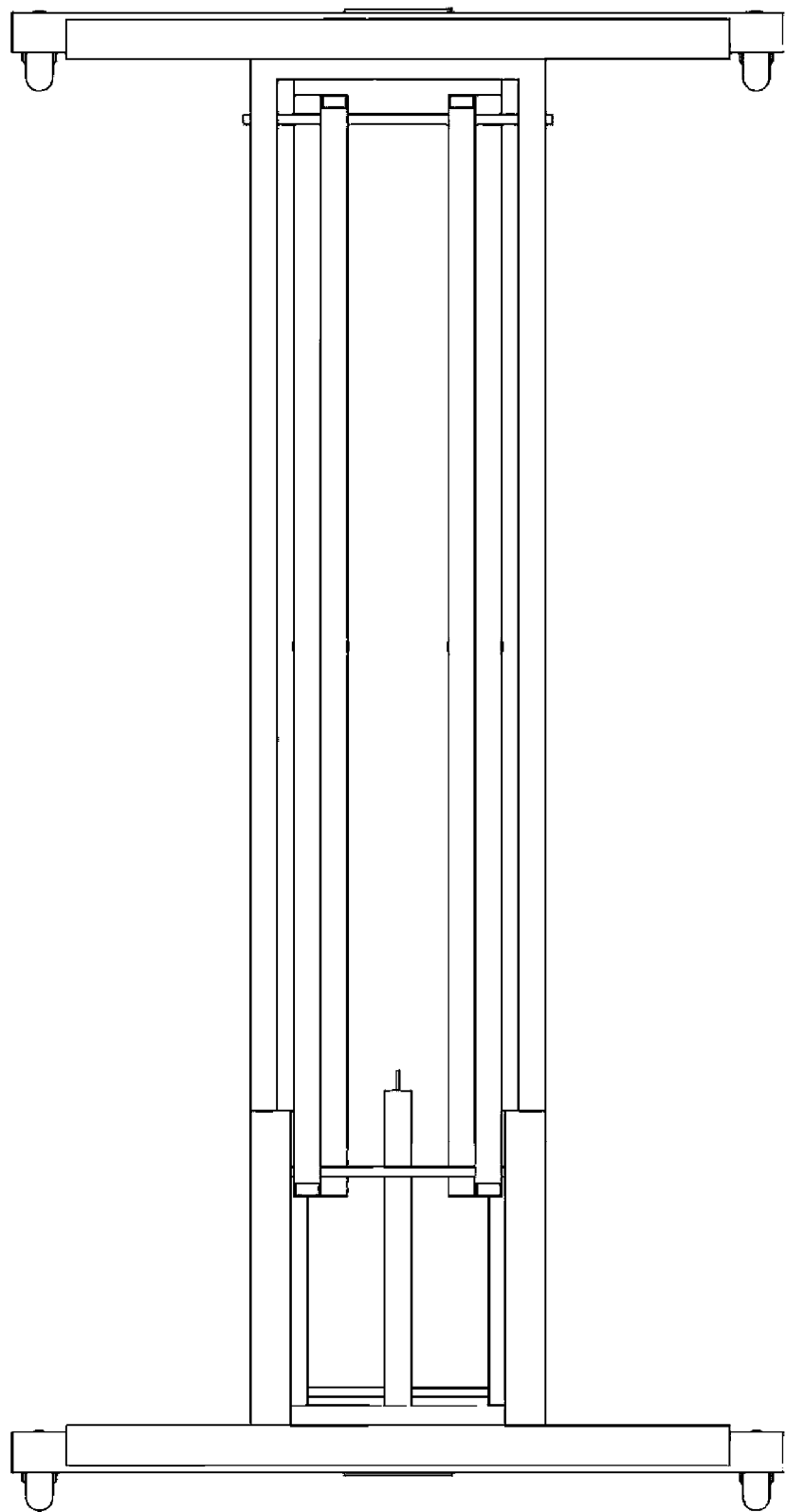
FIG. 27 depicts a top plan view of the cart of FIG. 21.
Figure 28:
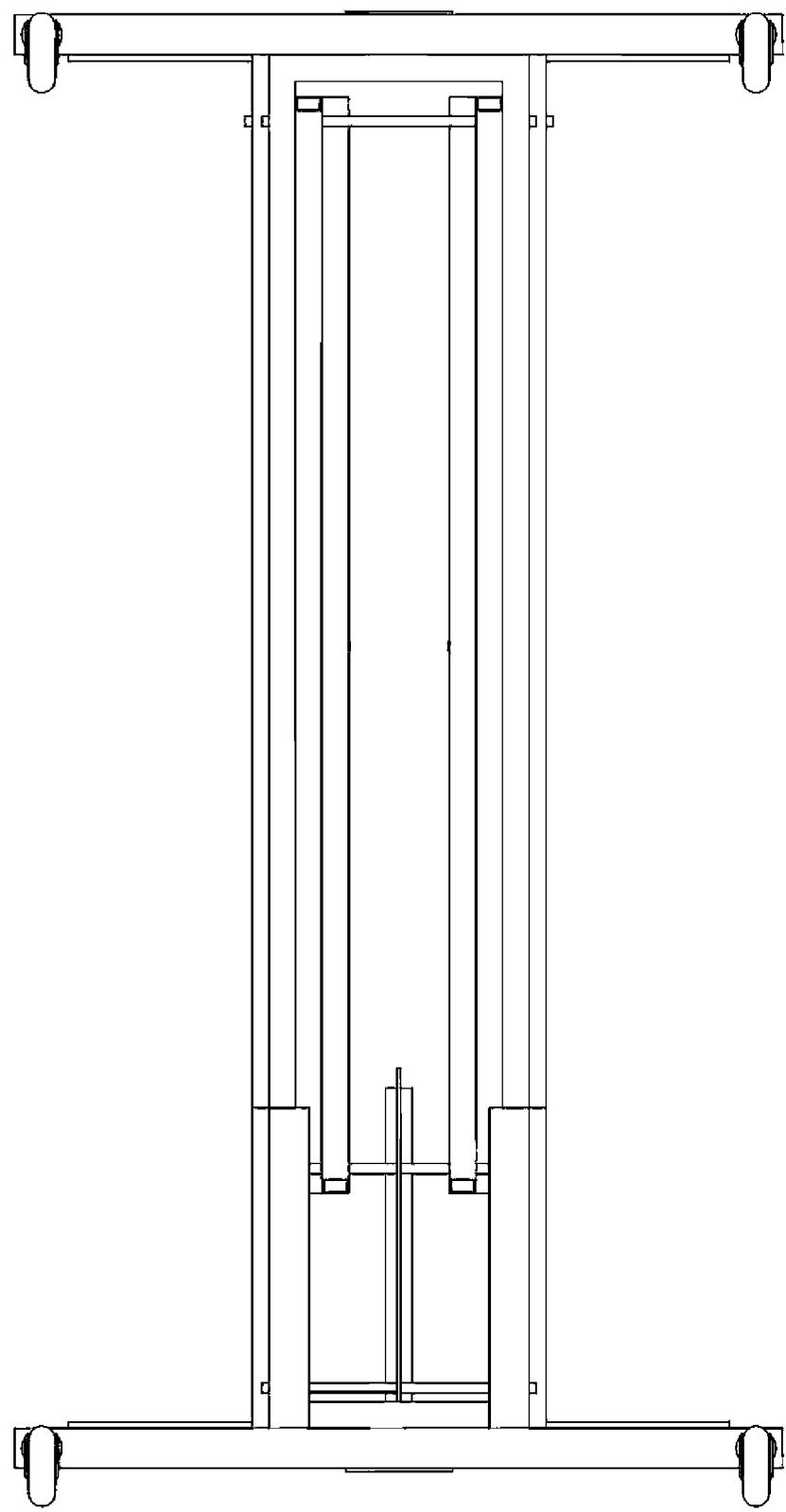
FIG. 28 depicts a bottom plan view of the cart of FIG. 21.

FIG. 23 depicts a first side elevation view of the cart of FIG. 21. In some implementations of the collapsible stackable storage cart, two castered wheels are positionally outset in relation to the basket frame.

Some implementations of the collapsible stackable storage cart 2100 include two tabs 2132 and 2302 that are attached to either side of the lateral member of the wheeled base, preferably along a longitudinal center axis. Tab 2132 is located on the actuation end (preferably on the actuation base-side), while tab 2302 is located on the side opposite the actuation end (preferably on the opposite base-side). Such tabs maintain the alignment of a pair of stacked carts, in the front-to-back direction (actuation end to opposite end).

Figure 29:
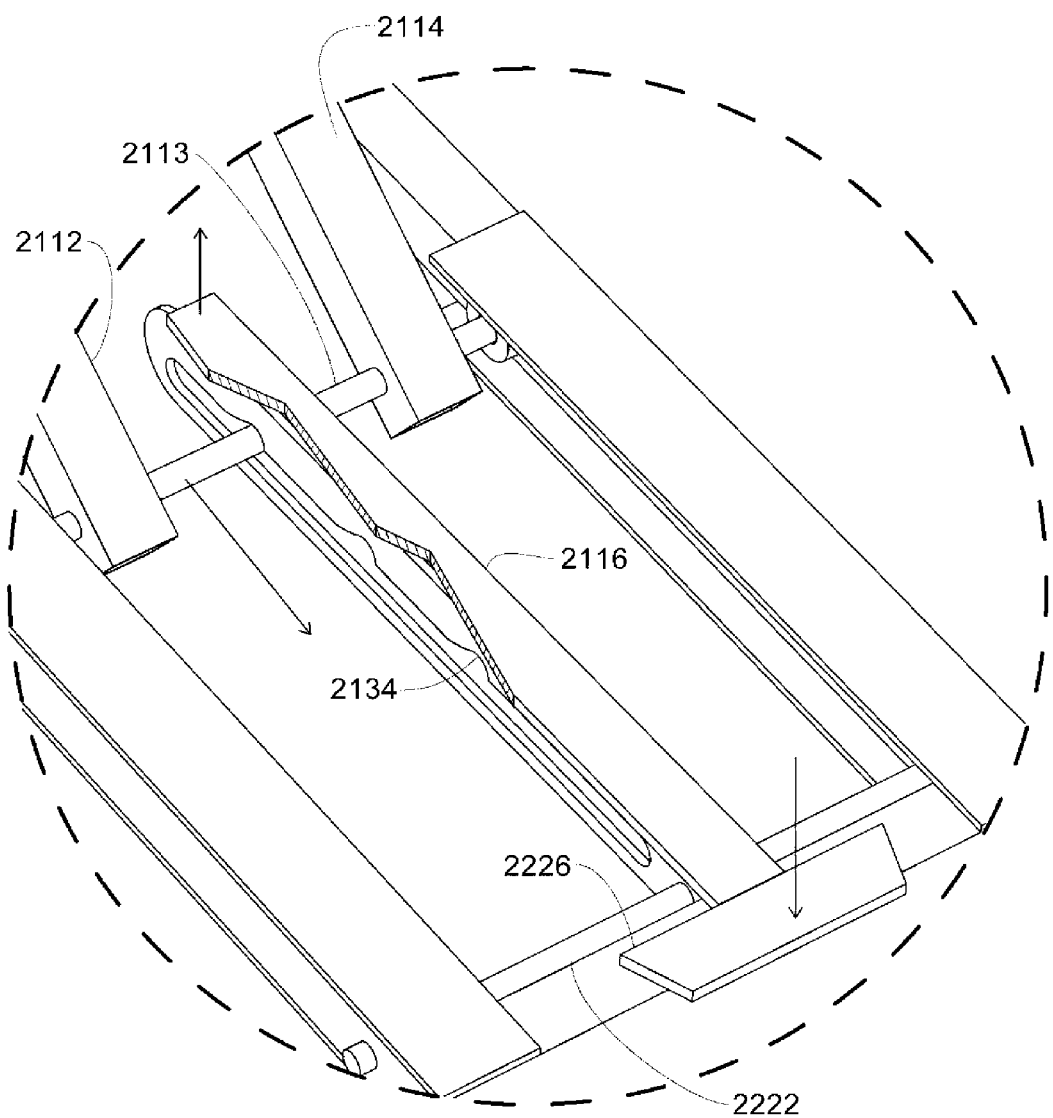
FIG. 29 depicts a close-up view of the portion encircled in FIG. 21.

FIG. 29 depicts a close-up of the portion encircled in FIG. 21 (an example of an actuation mechanism), with a portion of the actuation lever cut away, showing how the cross members 2112 and 2114 are slidably attached by a single notched member 2116. The actuation mechanism may include a fulcrum member 2222 anchored to the wheeled base, and an actuation lever having an actuation pedal 2226 in cooperating engagement with the fulcrum member and an opposite end region including a longitudinal slot impaled by the connecting span 2113 and having an upper border defining a plurality of notches 2134 configured to catch the span when the lever is in a resting position and the movable ends are moving toward the actuation base-side.

Figure 22:
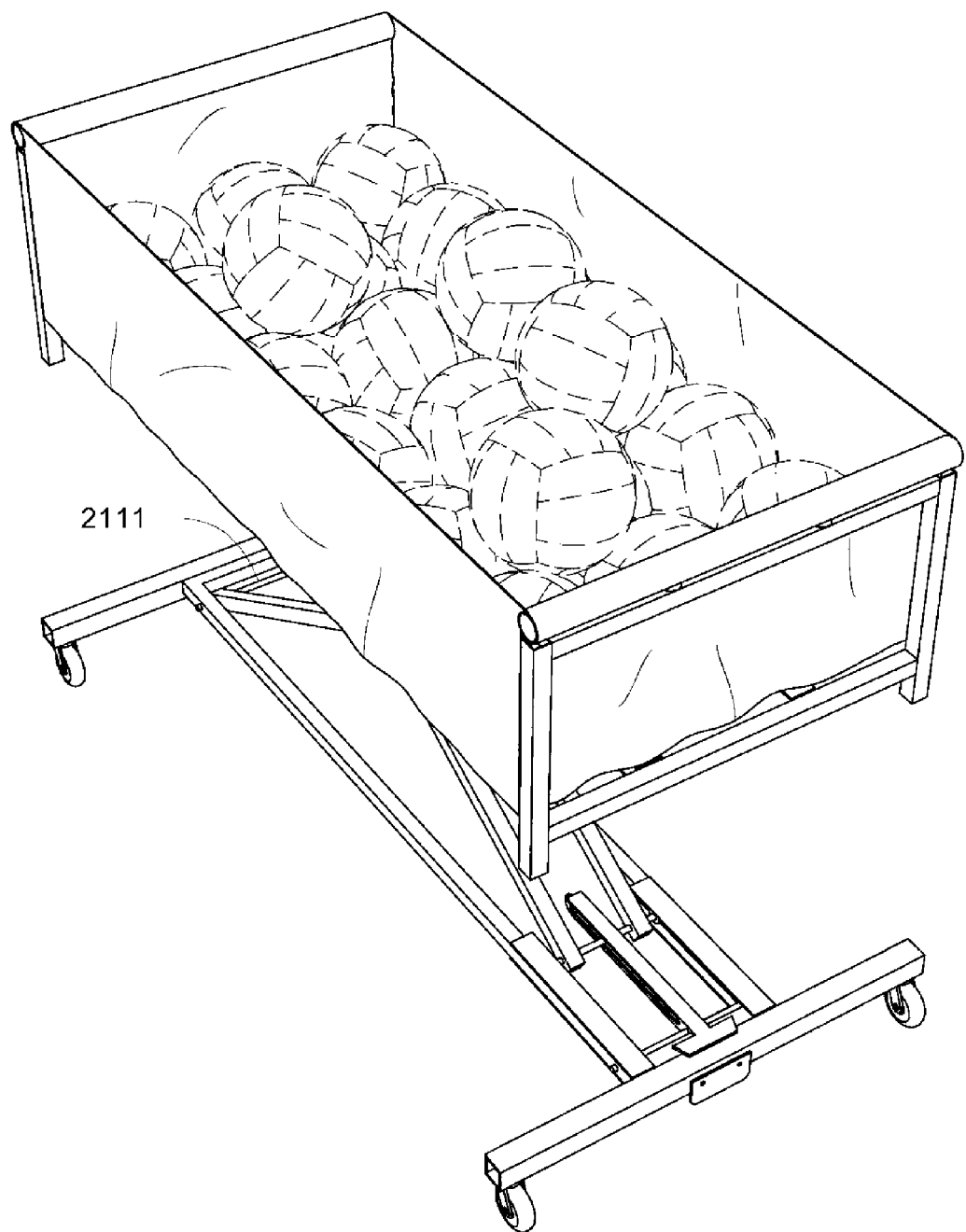
FIG. 22 depicts a perspective view of the embodiment of FIG. 21, with a storage receptacle.
Figure 30:
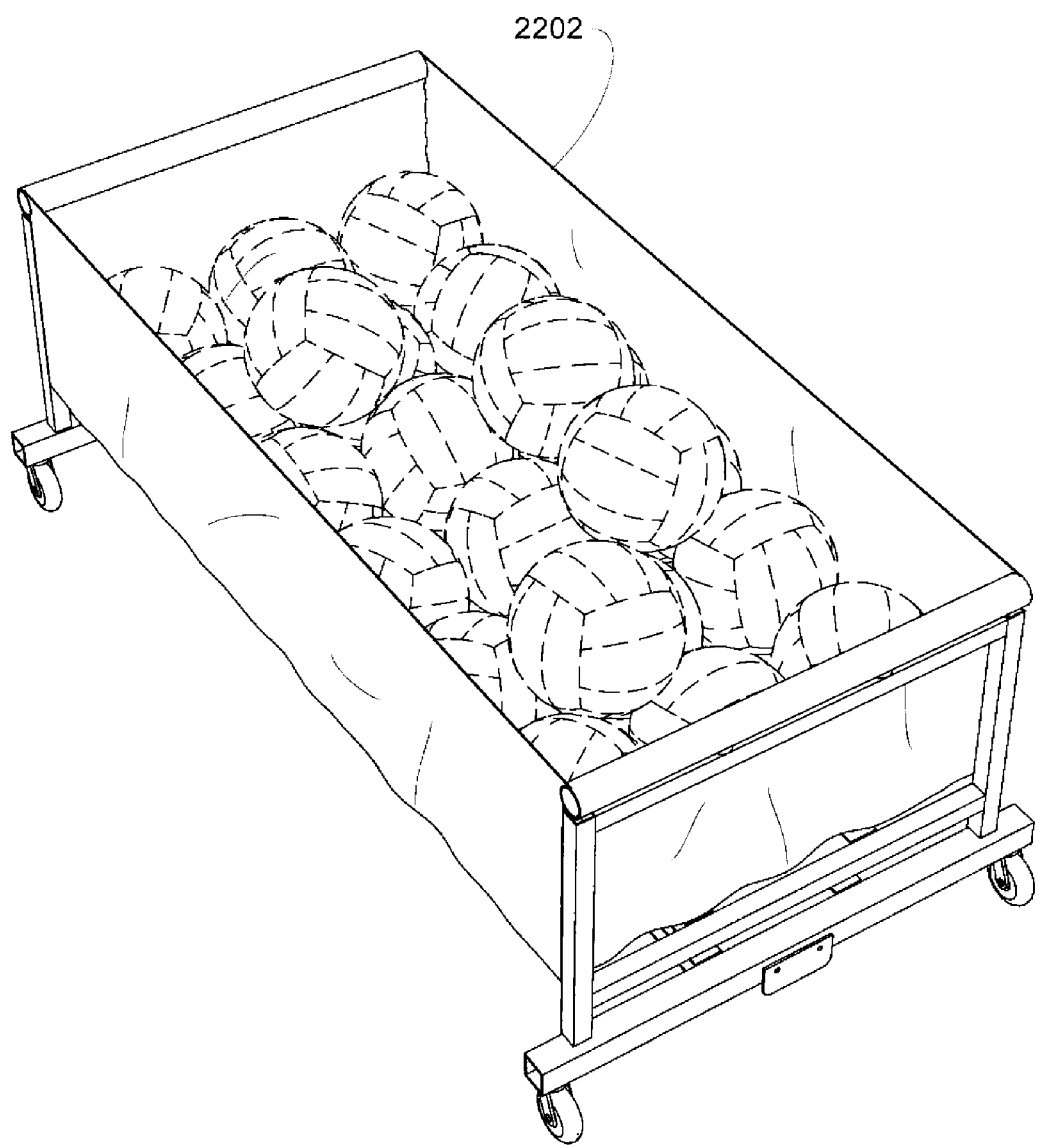
FIG. 30 depicts a perspective view of the cart of FIG. 21, in a fully collapsed configuration.

FIG. 30 depicts a perspective view of the cart of FIG. 22, in a fully collapsed configuration. The collapsible stackable storage cart includes a basket frame, that supports a storage receptacle 2202.

Figure 31:
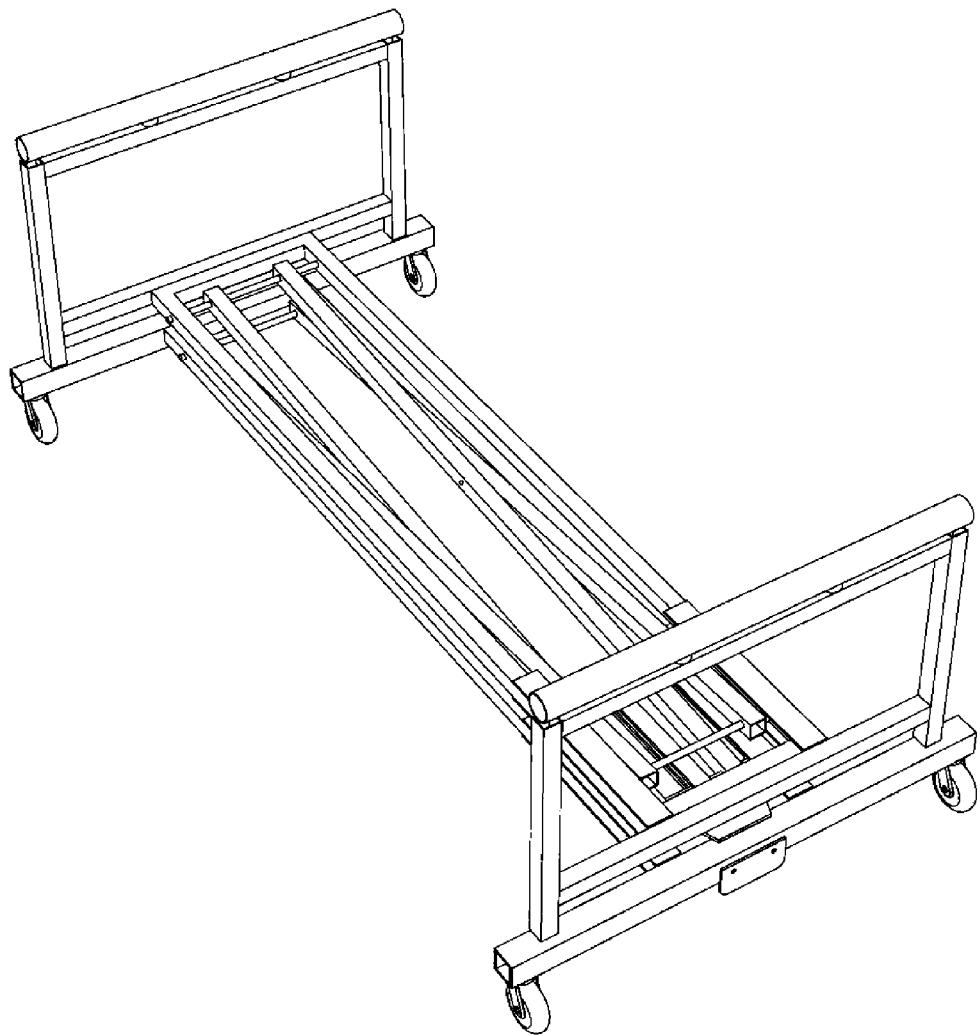
FIG. 31 depicts a perspective view of the embodiment of FIG. 30, with the storage receptacle removed.
Figure 32:
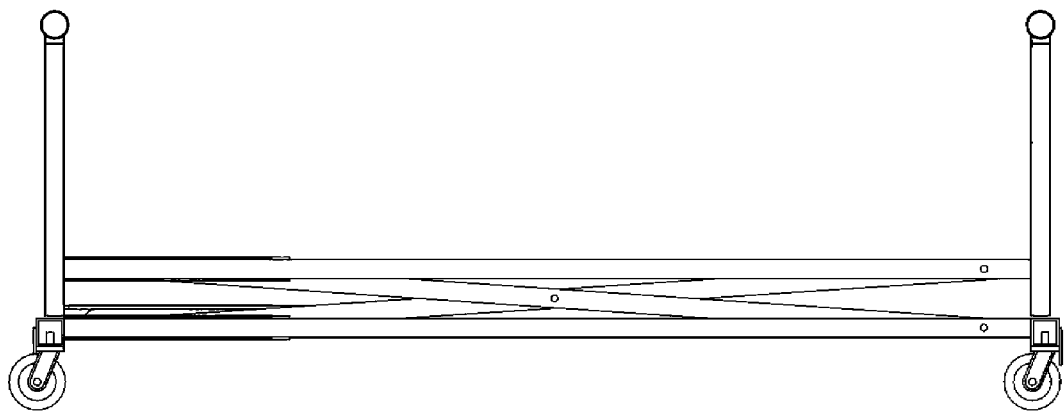
FIG. 32 depicts a first side elevation view of the cart of FIG. 31.
Figure 33:
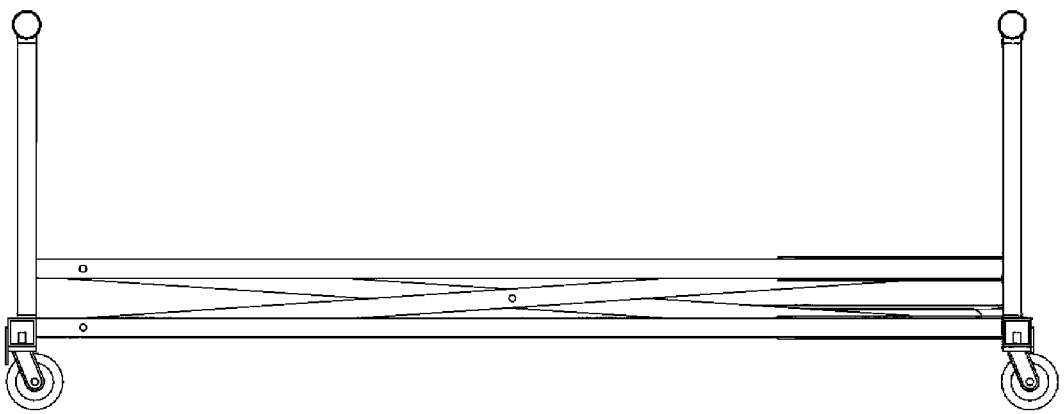
FIG. 33 depicts a second side elevation view of the cart of FIG. 31.
Figure 34:
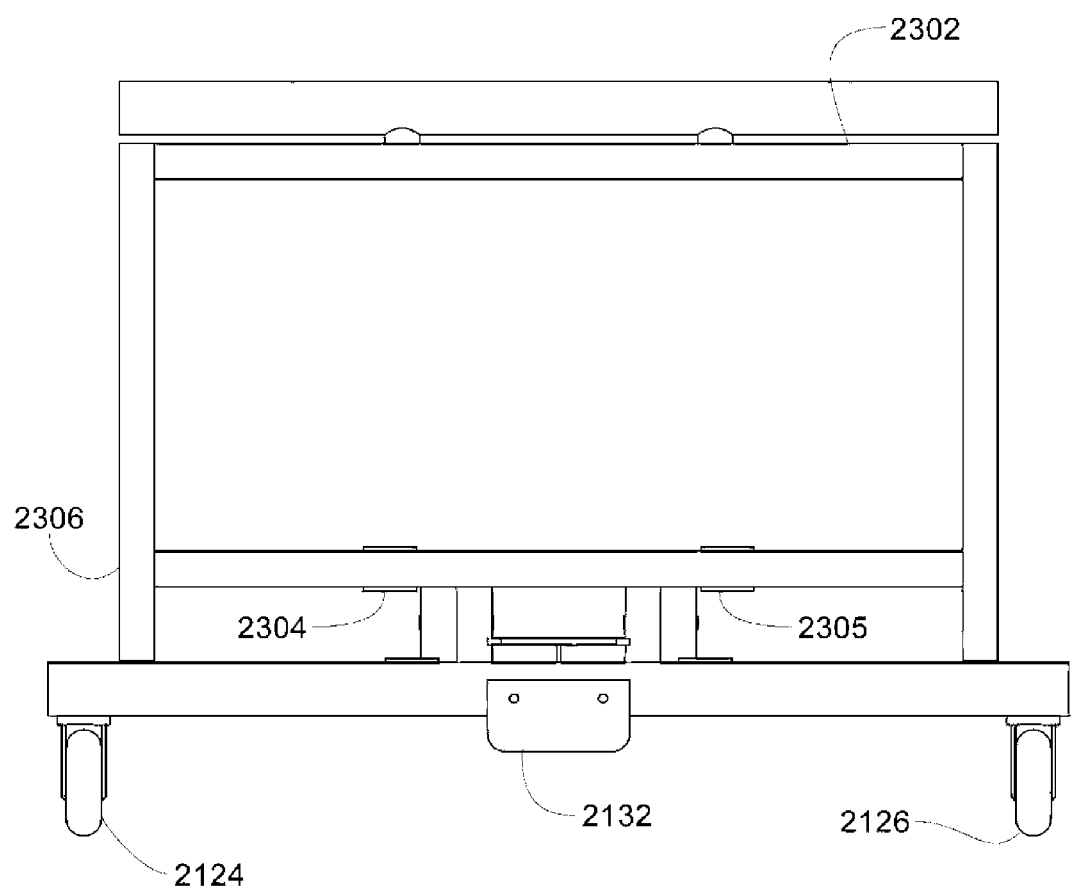
FIG. 34 depicts an elevation view of the cart of FIG. 31, from the actuation end.
Figure 35:
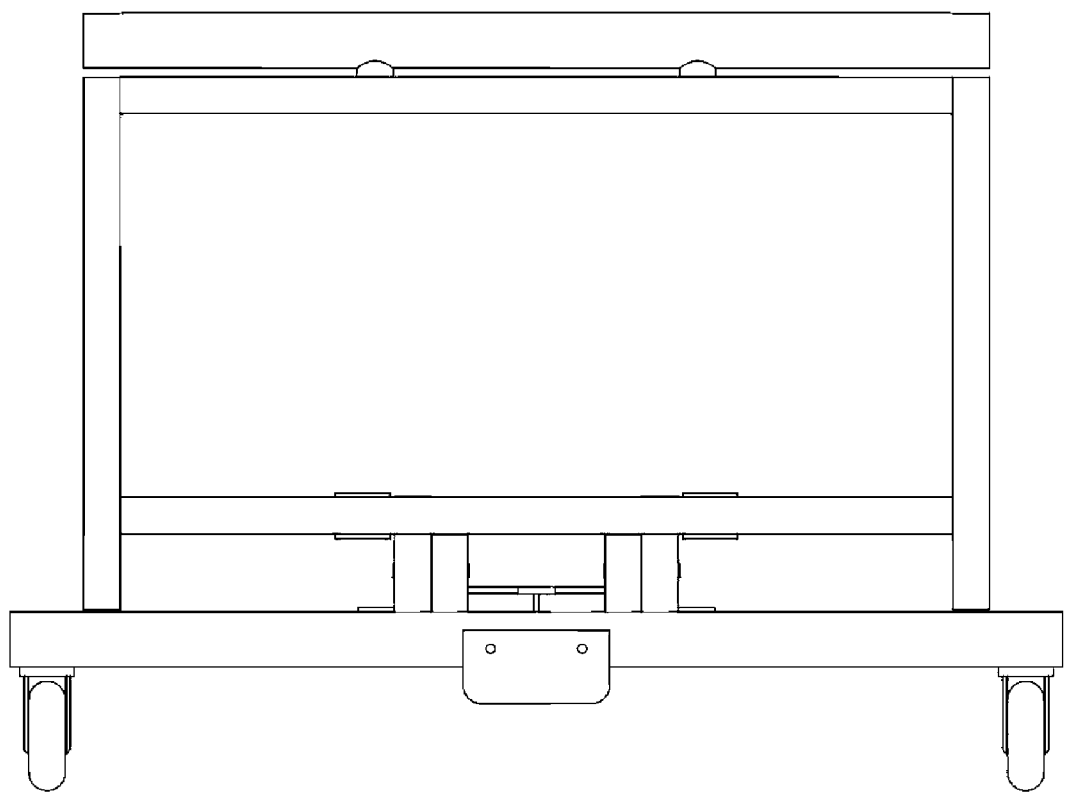
FIG. 35 depicts an elevation view of the cart of FIG. 31, from the end opposite to the actuation end.

FIG. 34 depicts an elevation view of the cart of FIG. 31, from the actuation end. The receptacle (or basket) frame may include an actuation upper side 2302 having opposite ends, an opposite second upper 2303 side having opposite ends, and a connecting upper frame including an essentially parallel pair of medial upper guide tracks (2304 and 2305), each connecting the upper sides. The upper sides may further include at least one stop member 2306 downstanding below the connecting upper frame a sufficient length to contact the wheeled base and bear the load of the cart and stored items in the fully collapsed storage configuration.

In some implementations of the collapsible stackable storage cart, two castered wheels (2124 and 2126) are positionally outset in relation to the basket frame.

Some implementations of the collapsible stackable storage cart include a tab 2132 attached to a base-side such as the actuation base-side of the wheeled base, preferably along a longitudinal center axis.

Figure 36:
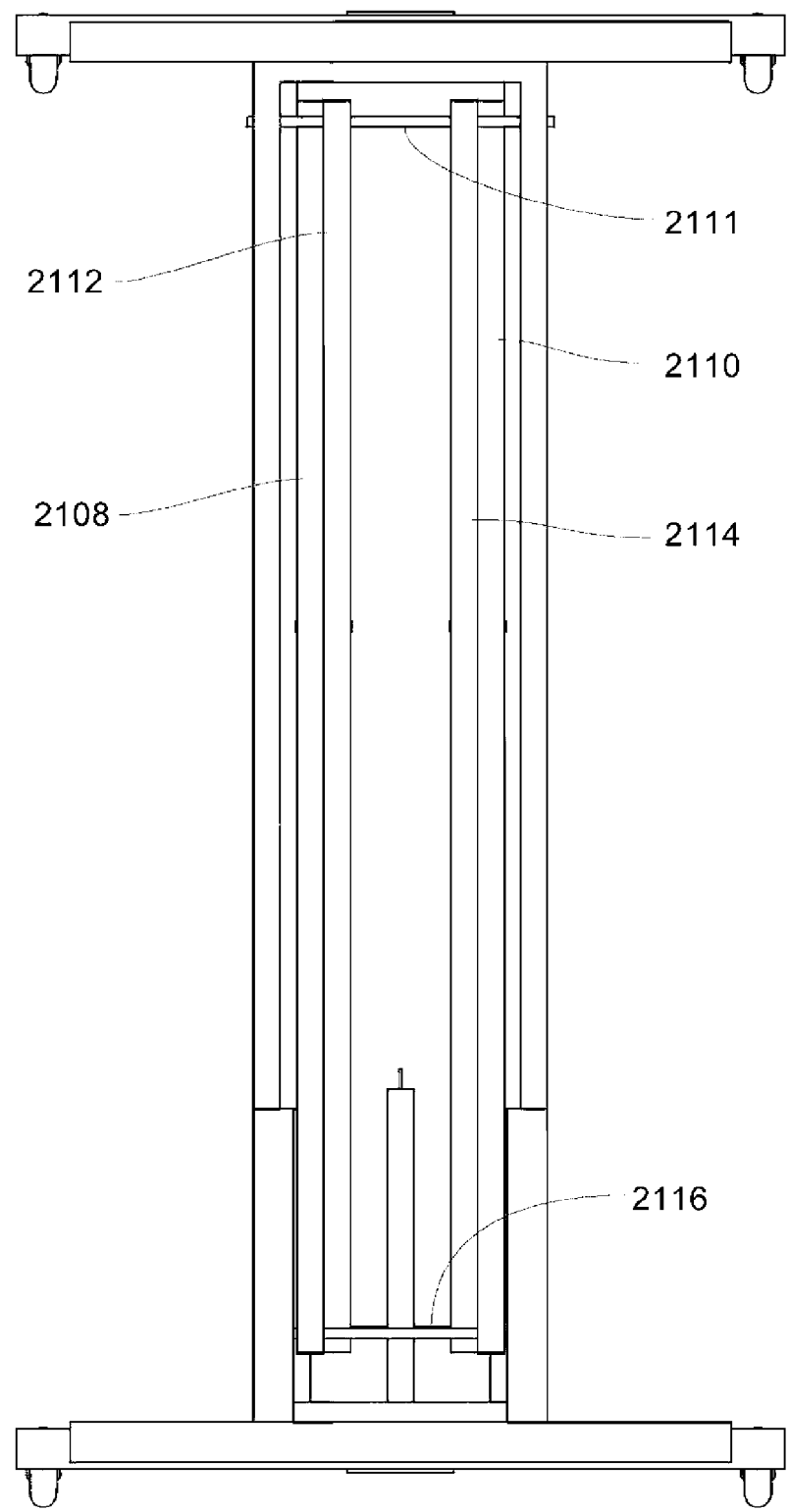
FIG. 36 depicts a top plan view of the cart of FIG. 31.
Figure 37:
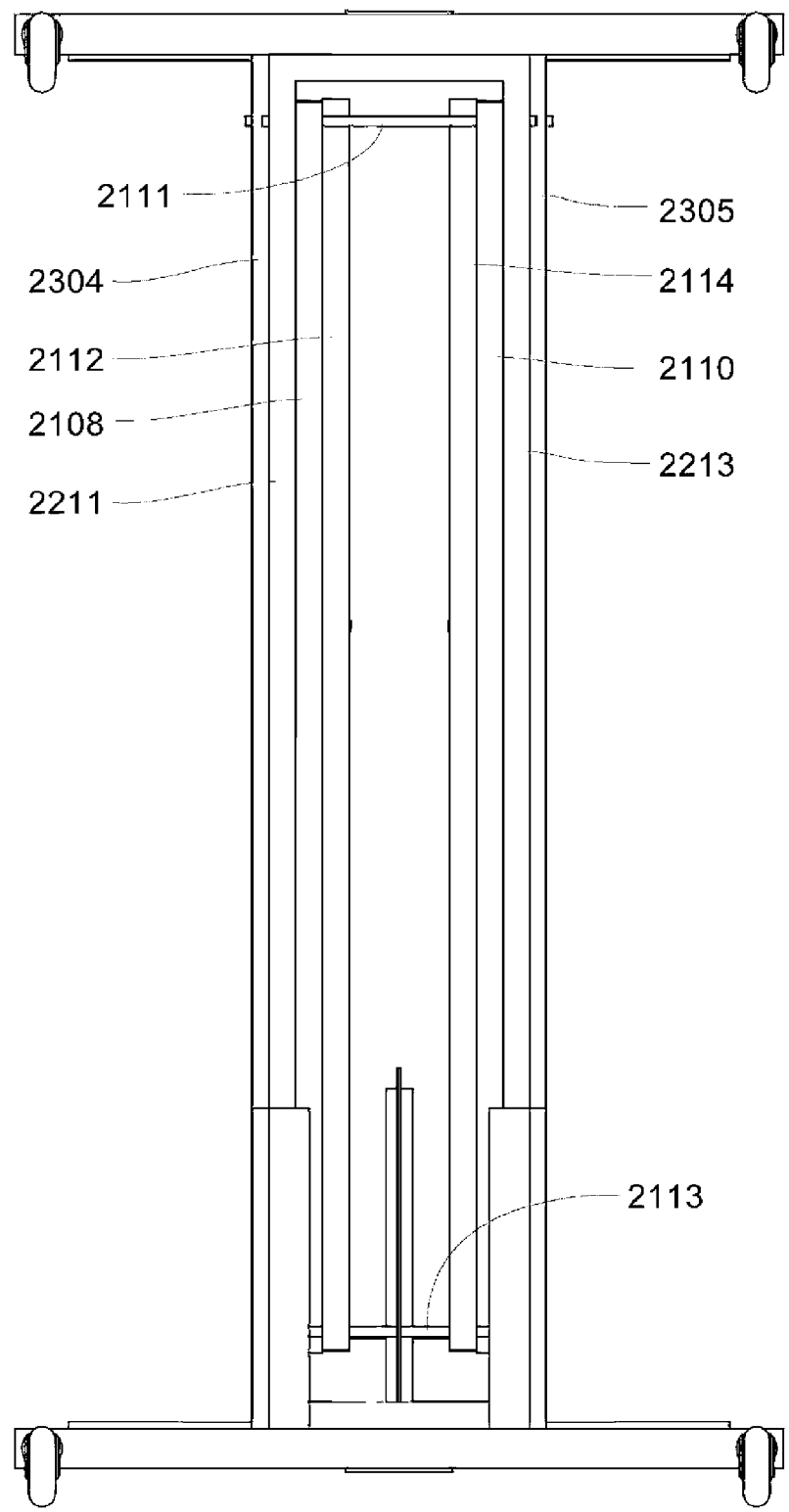
FIG. 37 depicts a bottom plan view of the cart of FIG. 31.

FIG. 36 depicts a top plan view of the cart of FIG. 31.

The cross members 2112 and 2114 are slidably attached to the wheeled base by a single notched member 2116 in the wheeled base. Each one of the two cross members 2108 and 2110 are rotatably attached to one of the two other cross members 2112 and 2114, respectively. For example, cross member 2108 is rotatably attached to cross member 2110 and cross member 2110 is rotatably attached to cross member 2114.

In some implementations of the collapsible stackable storage cart 2100, four castered wheels (2124, 2126, 2128 and 2130) are positionally outset in relation to the basket frame.

Figure 38:
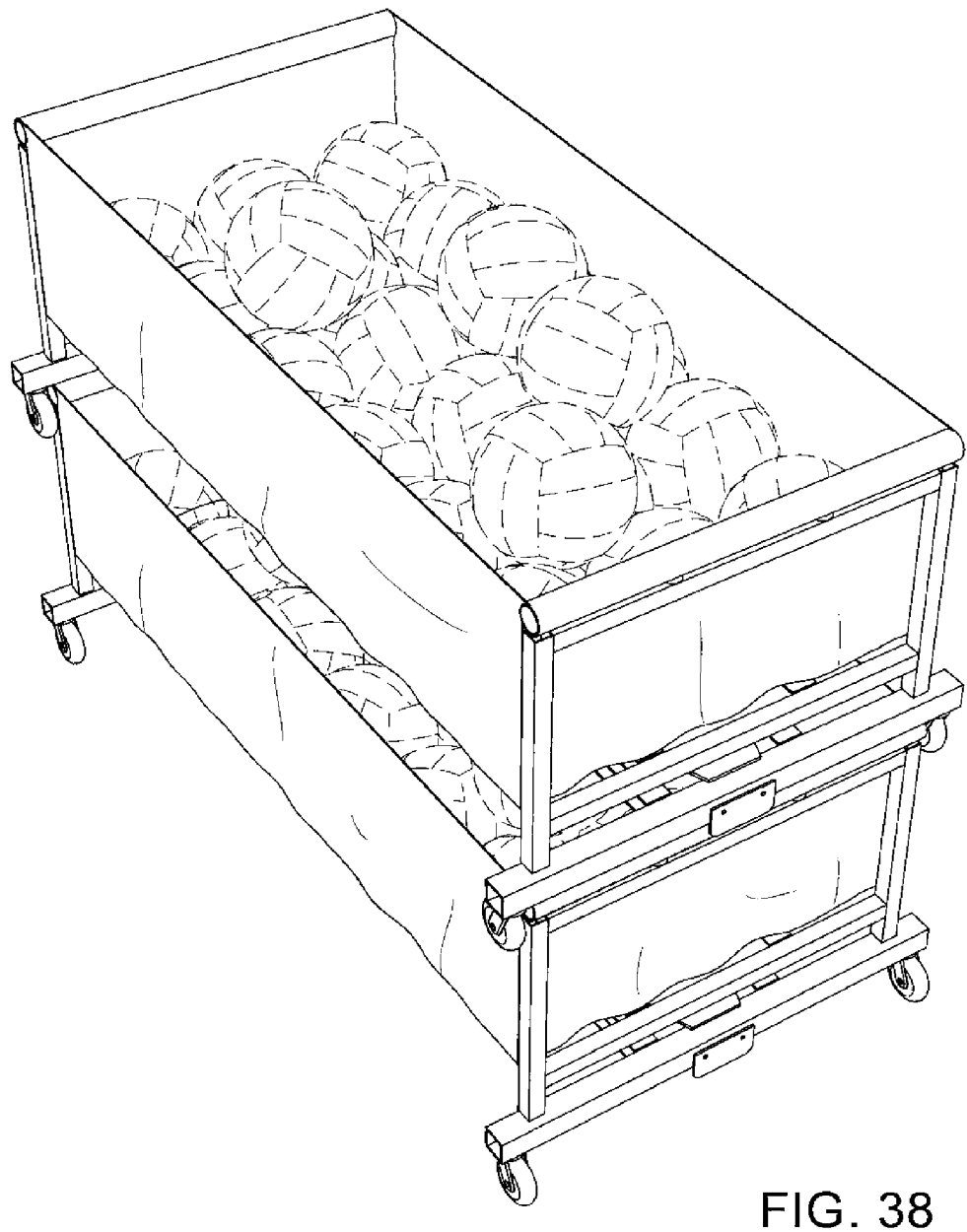
FIG. 38 depicts a perspective view of the cart of FIG. 31, stacked atop a second such cart.
Figure 39:
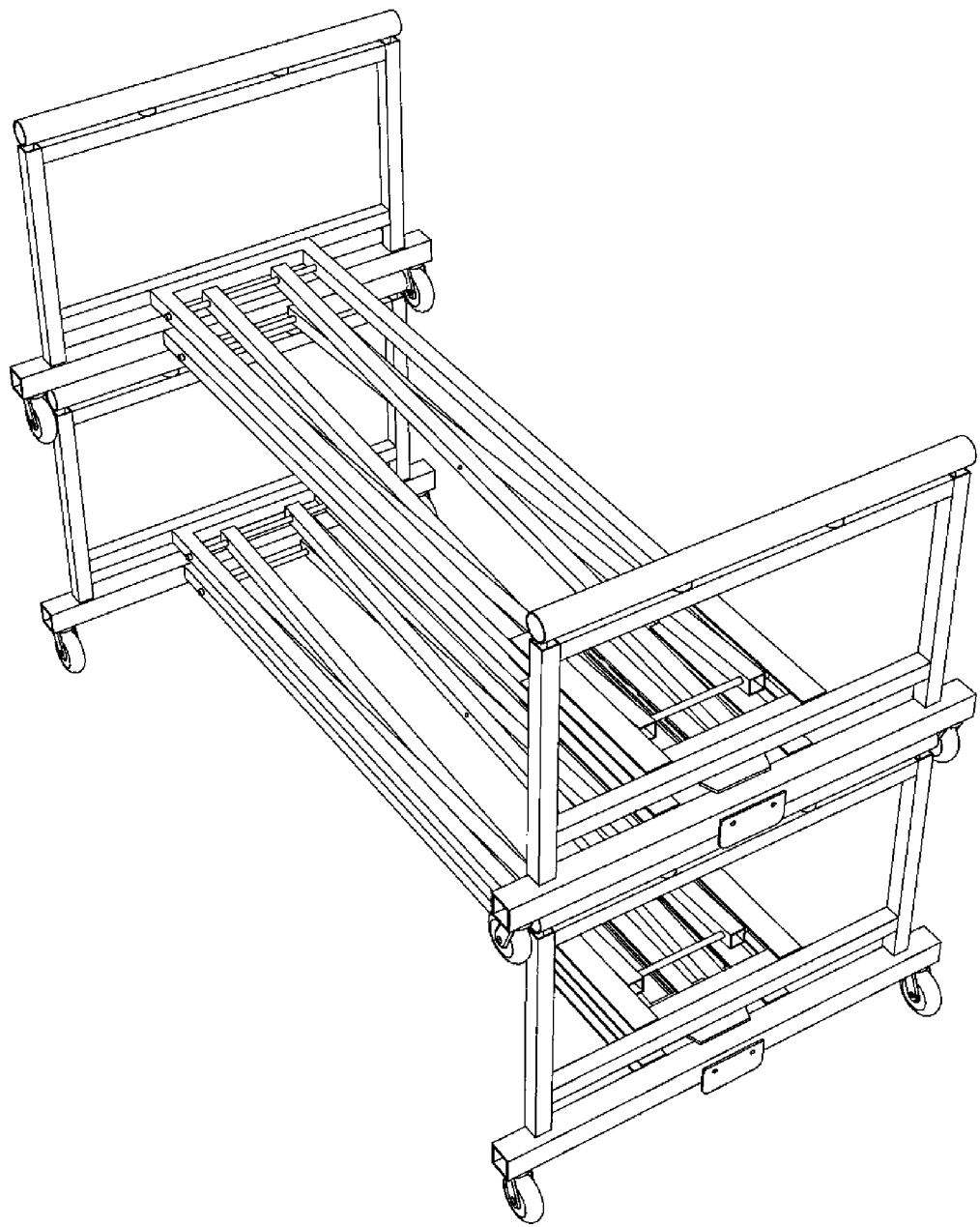
FIG. 39 depicts a perspective view of the carts of FIG. 8, with the storage receptacles removed.

FIG. 39 depicts a perspective view of the stacked carts of FIG. 38, with the storage receptacles removed. Both carts are maintained in vertical alignment, the front and back tabs of the top cart preventing displacement of the carts in the front-to-back direction, and the overhanging wheels of the top cart preventing displacement of the carts in the side-to-side direction.

One embodiment includes a cart storing items when in a fully collapsed configuration, including a wheeled base, a scissor extension apparatus mounted atop the wheeled base, a receptacle supported by the scissor apparatus, and an actuation mechanism governing the height of the receptacle. The wheeled base may include an actuation base-side having first and second ends, an opposite second base-side having first and second ends, and a connecting base-frame connecting the base-sides.

The connecting base-frame may include a pair of essentially parallel base guide tracks. The receptacle frame may include an actuation upper side, an opposite second upper side, and a connecting upper frame connecting the upper sides. Also included may be a scissor extension apparatus including at least one pair of first and second scissor-legs pivotally attached at a mid region, the first scissor-leg having a static pivot end rotatably attached to the wheeled base and a movable end operatively coupled to the receptacle frame, the second scissor-leg having a static pivot end rotatably attached to the receptacle frame and a movable end operatively coupled to the wheeled base. Preferably there are matched pair of scissor-legs supported by a respective base guide track, and supporting a respective upper guide track. Movement of the movable ends toward the respective static ends increases the height of the basket frame.

One or more of the operative couplings of the respective scissor-leg movable ends may include a wheel bearing rollable within a respective guide track. Preferably each such coupling includes a wheel bearing. Alternatively, one or more of the operative couplings of the respective scissor-leg movable ends may include a shoe slidable within a respective guide track.

The actuation mechanism may include a fulcrum member anchored to the wheeled base, and an actuation lever having an actuation portion 123 in cooperating engagement with the fulcrum member and, for each base guide track, an opposite end insertable within the guide track to stop movement of the respective scissor-leg movable end toward the actuation base-side. Preferably, the actuation mechanism may include a fulcrum rod anchored to the wheeled base (such as a rod bridging between base guide tracks); the mechanism may further include an actuation lever having an actuation portion (such as a pedal) in cooperating engagement with the fulcrum member and an opposite end region including a lower face defining a plurality of notches configured to catch the connecting span when the lever is in a resting position and the movable ends are moving toward the actuation base-side. Having a plurality of notches is beneficial in allowing the cart to be used in one of raised several resting positions. Moreover, it is not necessary to fully collapse the cart for stacking.

Another more specific embodiment may include a collapsible cart storing items when full, whether or not fully collapsed, including:

(a) a wheeled base including an actuation base-side 2101 having first and second ends, an opposite second base-side having first and second ends, and a connecting base-frame including an essentially parallel pair of medial base guide tracks, each connecting the base-sides;

(b) a basket supported by a basket frame including an actuation upper side 2120 having opposite ends, an opposite second upper side 2121 having opposite ends, and a connecting upper frame including an essentially parallel pair of medial upper guide tracks (2304 and 2305), each connecting the upper sides, the upper sides further including at least one stop member 2306 downstanding below the connecting upper frame a sufficient length to contact the wheeled base and bear the load of the cart and stored items in the fully collapsed storage configuration;

(c) a scissor extension apparatus attached to the wheeled base and including a plurality of separate pairs of first and second scissor-legs, each such pair pivotally attached at a mid region, the first scissor-leg having a static pivot end rotatably attached to a respective base guide track and a movable end operatively coupled to a respective upper guide track, the second scissor-leg having a static pivot end rotatably attached to the upper guide track and a movable end operatively coupled to the base guide track, movement of the movable ends toward the respective static ends increasing the height of the basket frame; and (d) an actuation mechanism governing the height of the basket in a raised configuration of the cart.

Each of the operative couplings of a second scissor-leg movable end may include a wheel bearing rollable within a respective base guide track, the wheels carried upon a connecting span; and the actuation mechanism may include a fulcrum member 2222 anchored to the wheeled base, and an actuation lever having an actuation pedal 2226 in cooperating engagement with the fulcrum member and an opposite end region including a lower face defining a plurality of notches configured to catch the span when the lever is in a resting position and the movable ends are moving toward the actuation base-side. Alternatively, the actuation mechanism may include a fulcrum rod bridging between the base guide tracks, and an actuation lever having an actuation pedal in cooperating engagement with the fulcrum rod. The opposite end region of the lever may include a longitudinal slot impaled by the wheel-bearings connecting span; the slot may have an upper border defining a plurality of notches, each configured to catch the span when the lever is in a resting position and the movable ends are moving toward the actuation base-side.

Alternatively, the actuation mechanism may be moved to the corresponding position on the upper frame. For example, the actuation mechanism may include a fulcrum member anchored to the upper frame, and an actuation lever having an actuation pedal in cooperating engagement with the fulcrum member and an opposite end region including a lower face defining a plurality of notches configured to catch the span when the lever is in a resting position and the movable ends are moving toward the actuation base-side. Alternatively, the actuation mechanism may include a fulcrum rod bridging between the upper guide tracks, and an actuation lever having an actuation pedal in cooperating engagement with the fulcrum rod. The opposite end region of the lever may include a longitudinal slot impaled by the wheel-bearings connecting span; the slot may have an upper border defining a plurality of notches, each configured to catch the span when the lever is in a resting position and the movable ends are moving toward the actuation base-side. Any claim directed to an actuation mechanism associated with the wheeled base should be construed to encompass an actuation mechanism associated with the upper frame.

The cart wheeled base further may include, at each base-side end, a castered wheel rotatable to be positionally outset in relation to a nearest upper side end of another such cart when stacking occurs. Each base-side may further include a downstanding tab engageable with an upper side of another such cart when stacking occurs.

One advantage this embodiment has over the earlier embodiment is that, when it is in the collapsed configuration, the weight of the device (plus the balls in the receptacle, plus any devices/balls stacked thereon) is born on a pair of supports 2306 downstanding from the uppermost horizontal member supporting the receptacle/bag. (In the first embodiment, the scissor axle pins bore the weight.)

Another feature of this preferred embodiment, adding advantage over the earlier embodiment, is that the opposite sets of scissor-legs have been moved toward the center of the device, rather than being separated by the width of the device and the "hanging" receptacle/bag; this narrowing makes it less likely that a user will be injured by the scissoring action, and it creates a surface for the receptacle/basket to rest upon. The receptacle may be further supported by one or more of the uprights of an upper end, or by the horizontal member connecting uprights, or by any horizontal crossbar associated with the upper end.

The mechanism for raising this embodiment has further advantages over the earlier described mechanism, in that it facilitates several heights depending upon which notch is selected for use. Any one of the notches will catch in a cross-plate to lock the cart at the desired height.

Besides the carts described herein, the invention includes the method of using the carts. When a cart is in its fully collapsed storage configuration, it may be raised by grasping the receptacle frame and lifting it up to just above the desired height. If the actuation mechanism is the multi-notch version, the user ceases depressing the actuation pedal, when slowly lowers the receptacle frame until the notch catches the connecting span between the wheel bearings.

To stack carts (whether with or without contents), the user depresses the actuation pedal while lifting the receptacle frame up slightly, to disengage the notched span; then the user lowers the receptacle frame to its hilly collapsed configuration, with the stops supporting the weight. After collapsing all carts needed to be stacked, two users lift one cart by its base and, with each user has rotated the respective base-side wheels outwardly, align the lifted cart on top of another cart, with the tab on each base-side overlapping the upper side of the lower cart.

If the carts have an essentially rectangular receptacle frame (without medial upper guide tracks), after the carts have been collapsed, two users lift one cart by its base and, when each user has rotated the respective base-side wheels inwardly, align the lifted cart on top of another cart so that each wheel fits within a corner of the receptacle frame.

What is claimed is:

1. A collapsible cart storing items when full and which can be stacked with another such cart while full, comprising a wheeled base supporting an elevation means supporting a receptacle frame, and an actuation mechanism governing the height of the receptacle frame, said wheeled base comprising castered wheels rotatable to be positioned in a cooperative relationship adjacent said receptacle frame of another such cart when lowered thereon for stacking, to maintain vertical alignment of said stacked carts, wherein:
   (a) said wheeled base comprises an actuation base-side having opposite ends, an opposite base-side having opposite ends, and a connecting base-frame connecting said base-sides;
   (b) said receptacle comprises a receptacle frame comprising an actuation upper side, an opposite upper side, and a connecting upper frame connecting said upper sides; and
   (c) said elevation means comprises a scissor extension apparatus comprising at least one pair of scissor-legs pivotally attached at a mid region, one such scissor-leg having a static pivot end rotatably attached to said wheeled base and a movable end operatively coupled to said receptacle frame, the other such scissor-leg having a static pivot end rotatably attached to said receptacle frame and a movable end operatively coupled to said wheeled base, movement of said movable ends toward said respective static ends increasing the height of said basket frame.

2. The cart of claim 1, wherein said connecting base-frame comprises an essentially parallel pair of base guide tracks and said connecting upper frame comprises an essentially parallel pair of upper guide tracks, each upper guide track supported by a separate pair of said scissor-legs.

3. The cart of claim 2, wherein each of the operative couplings of the respective scissor-leg movable ends comprises a wheel bearing rollable within a respective guide track.

4. The cart of claim 2, wherein each of the operative couplings of the respective scissor-leg movable ends comprises a shoe slidable within a respective guide track.

5. The cart of claim 2, wherein:
   (a) one of the upper guide tracks connects the actuation upper side end to the opposite upper side end, the other of the upper guide tracks connects the actuation upper side opposite end to the opposite upper side opposite end;
   (b) one of the base guide tracks connects the actuation base-side end to the opposite base-side end, the other of the base guide tracks connects the actuation base-side opposite end to the opposite base-side opposite end; and
   (c) the wheeled base further comprises, at each such corner connection of a base-side and guide track, a castered wheel mounted near the connection and rotatable to be positionally inset in relation to an adjacent upper side of another of such cart when stacking occurs.

6. The cart of claim 2, the actuation mechanism comprising a fulcrum member anchored to the wheeled base, and an actuation lever having an actuation pedal in cooperating engagement with the fulcrum member and, for each base guide track, an opposite end insertable within said guide track to stop movement of the respective scissor-leg movable end toward the actuation base-side.

7. The cart of claim 2, wherein:
   (a) the base guide tracks comprise a pair of medial base guide tracks, the upper guide tracks comprise a pair of medial upper guide tracks; and
   (b) the wheeled base further comprises, at each base-side end, a castered wheel rotatable to be positionally outset in relation to an adjacent upper side end of another such cart when stacking occurs.

8. The cart of claim 2, each base-side further comprising a downstanding tab engageable with an upper side of another such cart when stacking occurs.

9. The cart of claim 2, further comprising an open-top receptacle enclosure supported atop the connecting upper frame.

10. The cart of claim 2, wherein:
    (a) each of the operative couplings to a base guide track comprises a wheel bearing rollable within a respective base guide track, said wheels carried upon a connecting span; and
    (b) the actuation mechanism comprising, a fulcrum member anchored to the wheeled base, and an actuation lever having an actuation pedal in cooperating engagement with the fulcrum member and an opposite end region including a longitudinal slot defining a plurality of notches and impaled by the span.

11. The cart of claim 2, each upper side further comprising at least one stop member downstanding below the connecting upper frame and preventing further lowering of the receptacle frame.

12. A collapsible cart storing items when full, comprising:
    (a) a wheeled base comprising an actuation base-side having opposite ends, an opposite base-side having opposite ends, and a connecting base-frame comprising an essentially parallel pair of medial base guide tracks, each connecting the base-sides;
    (b) a basket supported by a basket frame comprising an actuation upper side having opposite ends, an opposite upper side having opposite ends, and a connecting upper frame comprising an essentially parallel pair of medial upper guide tracks, each connecting the upper sides, said upper sides further comprising at least one stop member downstanding below the connecting upper frame a sufficient length to contact the wheeled base and bear the load of the cart and stored items in the fully collapsed storage configuration;
    (c) a scissor extension apparatus attached to the wheeled base and comprising a plurality of separate scissor-leg pairs, each such pair pivotally attached at a mid region, one such scissor-leg having a static pivot end rotatably attached to a respective base guide track and a movable end operatively coupled to a respective upper guide track, the other such scissor-leg having a static pivot end rotatably attached to the upper guide track and a movable end operatively coupled to said base guide track, movement of the movable ends toward said respective static ends increasing the height of the basket frame; and
    (d) an actuation mechanism governing the height of the basket.

13. The cart of claim 12, wherein operative coupling of each movable end to a respective guide track comprises a wheel bearing rollable within the guide track.

14. The cart of claim 12, wherein:
    (a) each of the operative couplings to a base guide track comprises a wheel bearing rollable within a respective base guide track, said wheels carried upon a connecting span; and
    (b) the actuation mechanism comprises a fulcrum member anchored to the wheeled base, and an actuation lever having an actuation pedal in cooperating engagement with the fulcrum member and an opposite end region including a lower face defining a plurality of notches configured to catch the span when the lever is in a resting position and the movable ends are moving toward the actuation base-side.

15. The cart of claim 12, wherein:
(a) each of the operative couplings to the base guide track comprises a wheel bearing rollable within a respective base guide track, said wheels carried upon a connecting span; and
(b) the actuation mechanism comprises a fulcrum member anchored to the wheeled base, and an actuation lever having an actuation pedal in cooperating engagement with the fulcrum member and an opposite end region including a longitudinal slot impaled by the span and having an upper border defining a plurality of notches configured to catch the span when the lever is in a resting position and the movable ends are moving toward the actuation base-side.

16. The cart of claim 12, wherein the wheeled base further comprises, at each base-side end, a castered wheel rotatable to be positionally outset in relation to a nearest upper side end of another such cart when stacking occurs, and wherein each base-side further comprising a downstanding tab engageable with an upper side of another such cart when stacking occurs.

17. The cart of claim 12 wherein:
(a) the wheeled base further comprises, at each base-side end, a castered wheel rotatable to be positionally outset in relation to a nearest upper side end of another such cart when stacking occurs, and wherein each base-side further comprising a downstanding tab engageable with an upper side of another such cart when stacking occurs;
(b) each static pivot end of the scissor extension apparatus is rotatably attached to the wheeled base by a singular pivot member, each of the operative couplings of the scissor-leg movable ends comprises a wheel bearing rollable within a respective base guide track, said wheels carried upon a connecting span;
(c) the basket frame wherein each end of an upper side includes an upright having a lower end forming one of said stops and an upper end attached to a handle-bar member connecting both upper ends; and
(d) the actuation mechanism comprises a fulcrum member including a rod bridging between the base guide tracks, and an actuation lever having an actuation pedal in cooperating engagement with the rod and having an opposite end region including a longitudinal slot impaled by the span and having an upper border defining a plurality of notches configured to catch the span when the lever is in a resting position and the movable ends are moving toward the actuation base-side.

* * * * *